United States Patent
Nishimura et al.

(10) Patent No.: US 11,787,401 B2
(45) Date of Patent: Oct. 17, 2023

(54) COLLISION AVOIDANCE SUPPORT DEVICE

(71) Applicant: TOYOTA JIDOSHA KABUSHIKI KAISHA, Toyota (JP)

(72) Inventors: Motoki Nishimura, Susono (JP); Kotaro Saiki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 83 days.

(21) Appl. No.: 17/302,515

(22) Filed: May 5, 2021

(65) Prior Publication Data

US 2021/0253096 A1 Aug. 19, 2021

Related U.S. Application Data

(63) Continuation of application No. 15/850,313, filed on Dec. 21, 2017, now Pat. No. 11,034,347.

(30) Foreign Application Priority Data

Dec. 22, 2016 (JP) .................... 2016-249144

(51) Int. Cl.
  *B60W 30/095* (2012.01)
  *B60W 30/09* (2012.01)
  (Continued)

(52) U.S. Cl.
  CPC ........... *B60W 30/0956* (2013.01); *B60T 7/22* (2013.01); *B60T 8/17* (2013.01); *B60T 8/17558* (2013.01);
  (Continued)

(58) Field of Classification Search
  CPC ............. B60W 30/0956; B60W 30/09; B60W 2520/06; B60W 2554/00; B60W 2554/80;
  (Continued)

(56) References Cited

U.S. PATENT DOCUMENTS

2008/0167781 A1 7/2008 Labuhn et al.
2008/0297374 A1* 12/2008 Usami .................... G06V 20/58
  340/935
(Continued)

FOREIGN PATENT DOCUMENTS

CN  105291984 A  2/2016
DE  102013113054 A1  6/2014
(Continued)

OTHER PUBLICATIONS

English Translation CN105291984A (Year 2015).
(Continued)

*Primary Examiner* — Peter D Nolan
*Assistant Examiner* — Ashley L Redhead, Jr.
(74) *Attorney, Agent, or Firm* — Hunton Andrews Kurth LLP

(57) ABSTRACT

A collision avoidance support device comprises target detection unit, target type determination unit, relative position determination unit, target track prediction unit, and vehicle track prediction unit, obstacle determination unit. The vehicle track prediction unit is configured to enlarge the width of a vehicle predicted track compared with a case where an enlargement condition is not satisfied when the enlargement condition is satisfied. The enlargement condition is satisfied when the relative position determination unit detects that a target determined to be a pedestrian by the target type determination unit is positioned on a travel lane at least once.

2 Claims, 15 Drawing Sheets

(51) Int. Cl.
  *B60T 8/1755* (2006.01)
  *G08G 1/16* (2006.01)
  *B60T 7/22* (2006.01)
  *B60T 8/17* (2006.01)

(52) U.S. Cl.
  CPC ............ *B60W 30/09* (2013.01); *G08G 1/161* (2013.01); *G08G 1/165* (2013.01); *G08G 1/166* (2013.01); *G08G 1/167* (2013.01); *B60T 2201/022* (2013.01); *B60T 2210/32* (2013.01); *B60T 2260/02* (2013.01); *B60W 2520/06* (2013.01); *B60W 2554/00* (2020.02); *B60W 2554/80* (2020.02); *B60W 2710/182* (2013.01)

(58) Field of Classification Search
  CPC ..... B60W 2710/182; B60W 2050/143; B60W 30/0953; B60W 50/14; B60W 30/095; B60T 7/22; B60T 8/17; B60T 8/17558; B60T 2201/022; B60T 2210/32; B60T 2260/02; G08G 1/161; G08G 1/165; G08G 1/166; G08G 1/167
  See application file for complete search history.

(56) References Cited

U.S. PATENT DOCUMENTS

| | | |
|---|---|---|
| 2014/0032017 A1 | 1/2014 | Anderson et al. |
| 2014/0032049 A1 | 1/2014 | Moshchuk et al. |
| 2014/0152488 A1 | 6/2014 | Baba |
| 2014/0297171 A1 | 10/2014 | Minemura et al. |
| 2015/0379334 A1* | 12/2015 | Iwasaki .................. G06V 40/10 382/104 |
| 2017/0031363 A1* | 2/2017 | Laur ....................... G05D 1/024 |
| 2017/0120814 A1* | 5/2017 | Kentley ................. B60Q 5/008 |
| 2017/0120904 A1 | 5/2017 | Kentley et al. |
| 2017/0199274 A1 | 7/2017 | Sasabuchi et al. |
| 2017/0297568 A1* | 10/2017 | Kentley ................. B60W 30/09 |
| 2018/0154889 A1* | 6/2018 | Minemura ............ G08G 1/163 |
| 2018/0233048 A1* | 8/2018 | Andersson ............ G08G 1/166 |
| 2018/0297591 A1* | 10/2018 | Minemura ............ B60W 50/14 |
| 2018/0362033 A1 | 12/2018 | Newman et al. |

FOREIGN PATENT DOCUMENTS

| | | |
|---|---|---|
| DE | 102014103695 A1 | 10/2014 |
| JP | 2007251257 A | 9/2007 |
| JP | 2016192166 A | 11/2016 |

OTHER PUBLICATIONS

Final Office Action, United States Patent and Trademark Office, issued to U.S. Appl. No. 15/850,313 dated Jun. 22, 2020, 18 pages.

Non-Final Office Action, United States Patent and Trademark Office, issued to U.S. Appl. No. 15/850,313 dated Dec. 30, 2019, 23 pages.

Notice of Allowance, United States Patent and Trademark Office, issued to U.S. Appl. No. 15/850,313 dated Feb. 12, 2021, 14 pages.

* cited by examiner

//  COLLISION AVOIDANCE SUPPORT DEVICE

CROSS-REFERENCE TO RELATED APPLICATION

This is a continuation application of U.S. patent application Ser. No. 15/850,313, filed Dec. 21, 2017, which claims priority to Japanese Patent Application No. 2016-249144 filed on Dec. 22, 2016, which are incorporated herein by reference in their entirety.

BACKGROUND OF THE INVENTION

1. Field of the Invention

The present invention relates to a collision avoidance support device, which is configured to support a driver so that a vehicle avoids collision with an obstacle.

2. Description of the Related Art

Hitherto, there has been known a vehicle including a collision avoidance support device (for example, Japanese Patent Application Laid-open No. 2016-192166).

When a vehicle, on which this collision avoidance support device is mounted, travels on a travel lane of a road, the collision avoidance support device detects a target in front of the vehicle with using a camera or/and a radar sensor.

Further, the collision avoidance support device determines the type of the detected target with using the detection result. In other words, the collision avoidance support device determines which of a vehicle, a bicycle, a pedestrian, and etc. the detected target is.

Further, the collision avoidance support device calculates a vehicle predicted track which is a change of position of the vehicle having the collision avoidance support device during a period of time from the current time until a predetermined period of time passes.

This vehicle predicted track has a predetermined variable width which varies depending on the type of the detected target. Specially, when, for example, the target is a vehicle, this variable width becomes a small value. When the target is a pedestrian, this variable width becomes a large value.

Further, when determining that the target is a moving object, the collision avoidance support device calculates a target predicted track which is a change of position of the target during a period of time from the current time until a predetermined period of time passes.

When determining that the target is a moving object, the collision avoidance support device determines whether or not the vehicle predicted track and the target predicted track will interfere with each other.

When determining that the vehicle predicted track and the target predicted track will interfere with each other, the collision avoidance support device determines that this target is an obstacle being likely to collide with the vehicle.

When determining that the target is a stationary object, the collision avoidance support device determines whether or not the target and the vehicle predicted track will interfere with each other.

When determining that the target and the vehicle predicted track will interfere with each other, the collision avoidance support device determines that this target is an obstacle being likely to collide with the vehicle.

The collision avoidance support device determines whether or not this vehicle is highly likely to collide with the obstacle when the vehicle, on which this collision avoidance support device is mounted, continues to travel while keeping the current traveling state.

When determining that this vehicle is highly likely to collide with the obstacle, the collision avoidance support device executes automatic brake control.

The collision avoidance support device further determines whether or not this vehicle is highly likely to collide with the obstacle after executing the automatic brake control.

When determining that this vehicle is highly likely to collide with the obstacle, the collision avoidance support device executes automatic steering control so that the vehicle avoids collision with the obstacle.

As described above, when the target positioned in front of the vehicle, on which this collision avoidance support device is mounted, is a vehicle, the variable width of the vehicle predicted track becomes a small value. When the target is a pedestrian, this variable width becomes a large value. Thus, when the target is a pedestrian, the collision avoidance support device is easier to execute the automatic brake control and the automatic steering control compared with the case where the target is a vehicle.

However, when the automatic brake control and the automatic steering control are executed, an occupant of the vehicle is highly likely to feel uncomfortable. Therefore, the collision avoidance support device should execute the automatic brake control and the automatic steering control at a minimum necessary frequency.

When the pedestrian is positioned outside of the travel lane, a risk that the vehicle collides with the pedestrian is smaller compared with the case where the pedestrian is positioned on the travel lane.

However, the above collision avoidance support device enlarges the variable width of the vehicle predicted track even when the pedestrian is positioned outside of the travel lane.

Therefore, the collision avoidance support device is easy to execute unnecessary automatic brake control and unnecessary automatic steering control when the pedestrian is positioned outside of the travel lane.

SUMMARY OF THE INVENTION

The present invention has been made in order to solve the above-mentioned problem. Specifically, it is an object of the present invention to provide a collision avoidance support device capable of securely executing collision avoidance support control having high necessity and reducing a risk that collision avoidance support control having low necessity is executed by changing an operation condition of the collision avoidance support control depending on a position relation between a travel lane, on which a vehicle is traveling, and a pedestrian.

In order to achieve the above-mentioned object, according to one embodiment of the present invention, a collision avoidance support device comprises:

target detection means (28) for detecting a target (75, 80) existing in front of a vehicle (10) which travels on a travel lane (71, 71A) of a road (70, 70A);

target type determination means (28, 33) for determining a type of the target detected by the target detection means;

relative position determination means (31) for detecting relative position between the travel lane and the target;

target track prediction means (33) for calculating a target predicted track (Opov, Opopd) which is a change of position of the target during a period of time from current time until a predetermined period of time passes when the target type determination means determines that the target is a moving object;

vehicle track prediction means (32) for calculating a vehicle predicted track (Vpo1, Vpo2-b, Vpo2-I) which is a change of position of the vehicle during a period of time from current time until a predetermined period of time passes and has a predetermined width orthogonal in a plan view to a travelling direction of the vehicle;

obstacle determination means (34) determining that the target is an obstacle being likely to collide with the vehicle when the target predicted track and the vehicle predicted track will interfere with each other in a case where the target type determination means determines that the target is the moving object or when the target and the vehicle predicted track will interfere with each other in a case where the target type determination means determines that the target is a stationary object; and collision avoidance support control means (40, 60) for executing collision avoidance support control including at least one of alert control which activates alert means (20, 21) of the vehicle and automatic brake control which activates a brake device (22) of the vehicle.

The vehicle track prediction means is configured to enlarge the width of the vehicle predicted track when an enlargement condition is satisfied compared with a case where the enlargement condition is not satisfied. The enlargement condition is satisfied when the relative position determination means detects that the target determined to be a pedestrian (80) by the target type determination means is positioned on the travel lane at least once.

In the present invention, the predetermined enlargement condition is satisfied when the relative position determination means detects that the target determined to be a pedestrian by the target type determination means is positioned on the travel lane at least once.

When the enlargement condition is satisfied, the vehicle track prediction means enlarges the width of the vehicle predicted track compared with a case where the enlargement condition is not satisfied.

Thus, when the pedestrian is positioned on the travel lane, the collision avoidance support device is easier to execute the collision avoidance support control compared with the case where the pedestrian is positioned outside of the travel lane. In other words, when the pedestrian is positioned outside of the travel lane, the collision avoidance support device is harder to execute the collision avoidance support control compared with the case where the pedestrian is positioned on the travel lane.

When the pedestrian is positioned on the travel lane, a risk that the vehicle collides with the pedestrian is larger compared with the case where the pedestrian is positioned outside of the travel lane.

However, in this case, since the vehicle track prediction means enlarges (increases) the width of the vehicle predicted track, the collision avoidance support control having high necessity is securely executed.

On the other hand, when the pedestrian is positioned outside of the travel lane, a risk that the vehicle collides with the pedestrian is smaller compared with the case where the pedestrian is positioned on the travel lane.

However, in this case, since the vehicle track prediction means downscales (decreases) the width of the vehicle predicted track, a risk that the collision avoidance support control having low necessity is executed becomes small.

A feature of one embodiment of the present invention resides in that the target type determination means is configured to determine whether or not the target is the pedestrian set number of times, which is predetermined multiple times, within a predetermined period of time for determining condition satisfaction.

The relative position determination means is configured to detect the relative position between the travel lane and the target the set number of times within the period of time for determining condition satisfaction.

The enlargement condition is satisfied when the number of times that the relative position determination means detects that the target, which is determined to be the pedestrian by the target type determination means, is positioned on the travel lane is equal to or greater than a predetermined threshold number (Thn), the threshold number being equal to less than the set number of times.

The determination accuracy of the target type determination means may be low, and/or the determination accuracy of the relative position determination means may be low.

According to this one of aspects of the present invention, also in this case, a risk that the enlargement condition is erroneously satisfied can be reduced.

In the description given above, in order to facilitate understanding of the present invention, names and/or reference symbols in parentheses used in an embodiment of the present invention described later are added to components of the invention corresponding to the embodiment. However, respective components of the present invention are not limited to the embodiment prescribed by the reference symbols. Other objects, other features, and accompanying advantages of the present invention can be readily understood from a description of the embodiment of the present invention provided referring to the accompanying drawings.

DESCRIPTION OF THE EMBODIMENTS

Now, referring to the accompanying drawings, description is given of a vehicle (automobile) 10 to which a collision avoidance support device according to an embodiment of the present invention is mounted.

Figure 1:
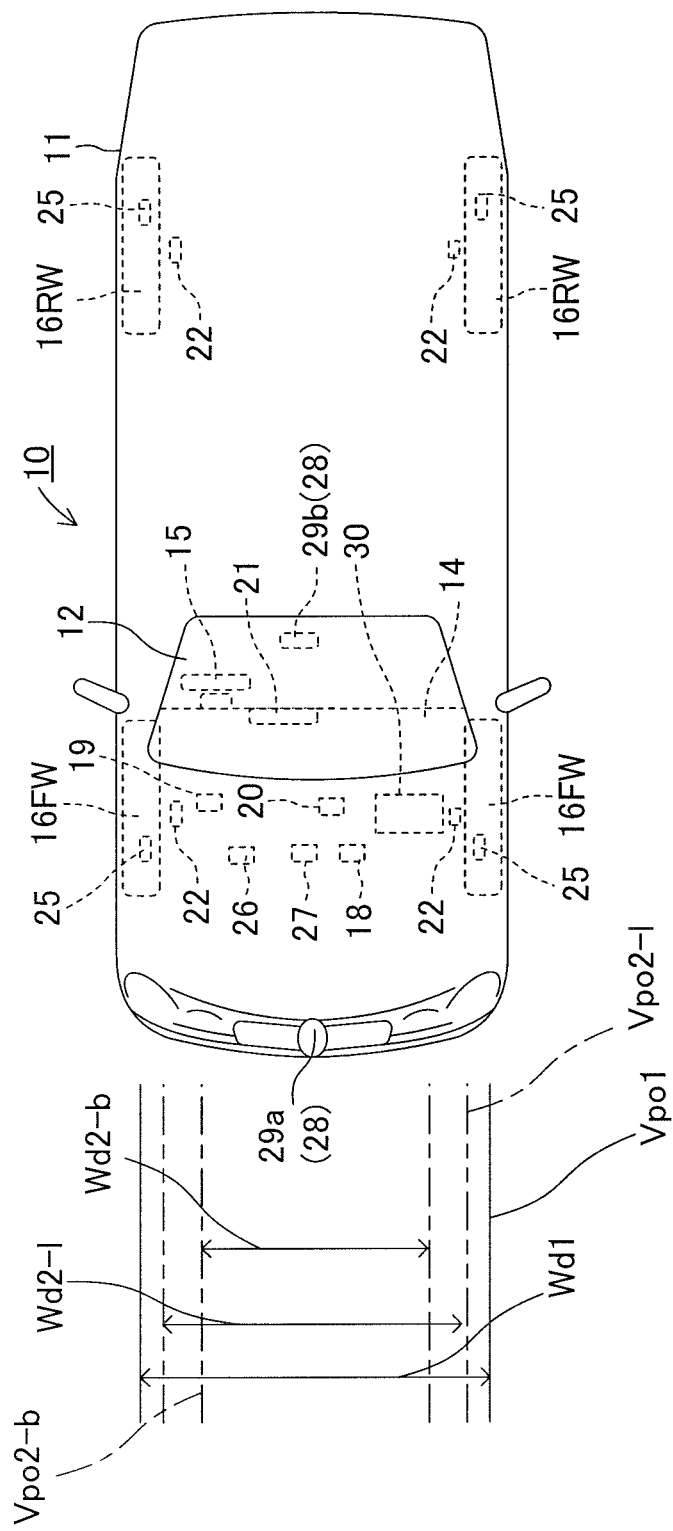
FIG. 1 is a plan view of a vehicle to which a collision avoidance support device according to an embodiment of the present invention is mounted.

As illustrated in FIG. 1, a windshield 12 formed of a transmissive material (e.g., glass or resin) is fixed to a vehicle body 11 of the vehicle 10.

A dashboard 14 is fixed to a front part of the inside of the vehicle 10. A steering wheel 15 is rotatably supported in a right-side part of the dashboard 14.

The vehicle 10 further includes a pair of left and right front wheels 16FW and a pair of left and right rear wheels 16RW. The left and right front wheels 16FW are steered wheels.

A collision avoidance support mode selection switch (not shown) is arranged on the dashboard 14.

When the collision avoidance support mode selection switch is positioned at an on position, a support ECU 30, a brake ECU 40, a steering ECU 50, and an alert ECU 60 execute collision avoidance support control (alert control, automatic brake control, and automatic steering control) described later. Meanwhile, when the collision avoidance support mode selection switch is positioned at an off position, the support ECU 30, the brake ECU 40, the steering ECU 50, and the alert ECU 60 do not execute the collision avoidance support control.

Figure 2:
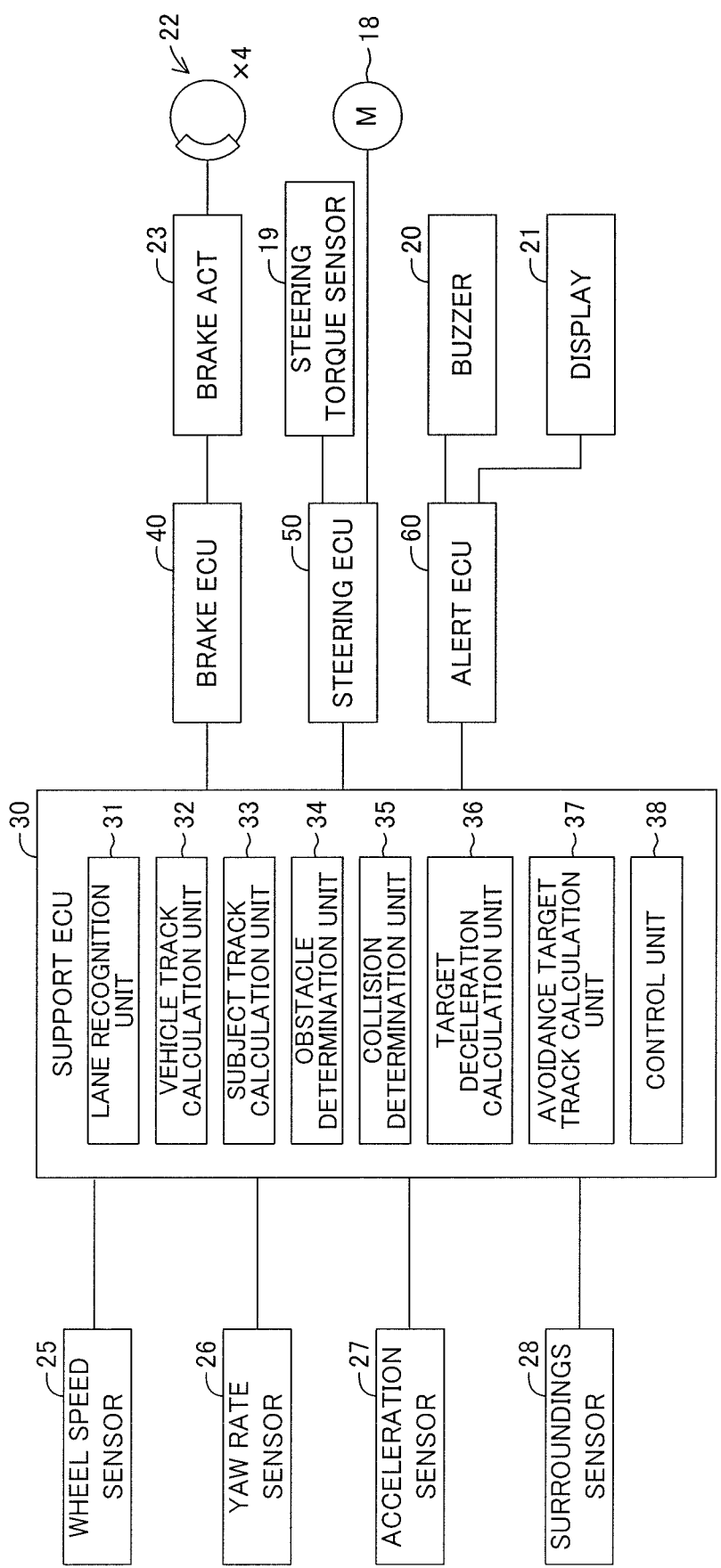
FIG. 2 is a system configuration diagram of the collision avoidance support device.

The steering wheel 15 and the left and right front wheels 16FW are connected to each other via a known electric power steering mechanism. Only a part of components of the electric power steering mechanism is illustrated in FIG. 1 and FIG. 2.

The electric power steering mechanism includes a rack shaft extending in a left-and-right direction of the vehicle and slidable in the left-and-right direction. A pair of left and right tie rods is connected to left and right ends of the rack shaft, and the left and right tie rods are connected to left and right carriers. The left and right carriers are rotatable about king pin axes with respect to the vehicle body 11. Further, the left and right carriers rotatably support the left and right front wheels 16FW about a horizontal axis, respectively. A pinion shaft meshes with a thread groove formed in the rack shaft. One end (lower end) of a steering shaft is connected to the pinion shaft via a universal joint. Further, the steering wheel 15 is fixed to the other end (upper end) of the steering shaft.

Accordingly, when the steering wheel 15 is rotated, this rotation force is transmitted to the steering shaft, the universal joint, and the pinion shaft. Then, the rack shaft meshing with the pinion shaft slides in one direction out of the left and right directions, and thus steering angles of the left and right front wheels 16FW linked to the rack shaft via the tie rods and the carriers change.

The electric power steering mechanism further includes an electric motor 18. The electric motor 18 is linked to the rack shaft via a speed reduction mechanism.

The electric power steering mechanism further includes a steering torque sensor 19 for detecting a steering torque (torsion angle) of a torsion bar, which forms a middle portion of the steering shaft.

For example, when the steering torque is generated in the steering shaft as a result of a driver's operation of the steering wheel 15 for rotation, the steering ECU 50 described later calculates a target steering assist torque based on the steering torque detected by the steering torque sensor 19. Further, the steering ECU 50 controls the electric motor 18 for rotation to cause the electric motor 18 to output a rotation force corresponding to the target steering assist torque. Then, a torque generated by the electric motor 18 is transmitted to the rack shaft, and thus the steering assist is executed.

Further, as illustrated in FIG. 1 and FIG. 2, the vehicle 10 includes a buzzer 20, a display 21, and four friction brake mechanisms 22.

The buzzer 20 is capable of beeping.

The display 21 is a liquid crystal display fixed to the dashboard 14.

Each of the friction brake mechanisms 22 is connected to a brake actuator 23. The brake actuator 23 is arranged in a hydraulic circuit, which is arranged between a master cylinder (not shown) configured to pressurize a hydraulic fluid when a brake pedal is stepped on and each of the friction brake mechanisms 22. When the brake pedal is stepped on, the hydraulic fluid pressurized by the master cylinder is supplied from the brake actuator 23 to the friction brake mechanisms 22, to thereby apply braking forces to the front wheels 16FW and the rear wheels 16RW by the respective friction brake mechanisms 22.

The vehicle 10 further includes wheel speed sensors 25, a yaw rate sensor 26, and an acceleration sensor 27.

The wheel speed sensors 25 are arranged so as to correspond to the respective front wheels 16FW and rear wheels 16RW. Each of the wheel speed sensors 25 is configured to detect a wheel speed of a corresponding one of the front wheels 16FW and the rear wheels 16RW.

The yaw rate sensor 26 is configured to detect a yaw rate of the vehicle 10.

The acceleration sensor 27 is configured to detect a longitudinal acceleration acting in a front-and-rear direction of the vehicle 10 and a lateral acceleration acting in the left-and-right direction (vehicle width direction) of the vehicle 10.

The vehicle 10 further includes a surroundings sensor 28. The surroundings sensor 28 includes a radar sensor 29a and a camera 29b.

The radar sensor 29a fixed to a front end of the vehicle body 11 is configured to radiate a millimeter radio wave around (including at least a front side of) the vehicle 10. When the radio wave radiated by the radar sensor 29a is reflected by, for example, a reflector (e.g., a pedestrian) positioned around the vehicle 10, the radar sensor 29a receives the reflected wave. Then, calculation means built in the radar sensor 29a calculates, based on radiation and reception timings of the radio wave, presence or absence of the reflector and a relative relationship between the vehicle 10 and the reflector (e.g., the distance between the vehicle 10 and the reflector and a relative speed between the vehicle 10 and the reflector).

The camera 29b is arranged inside the vehicle 10 so as to be positioned immediately behind the windshield 12, and is formed using a stereo camera.

The camera 29b is configured to image a subject (e.g., a pedestrian) positioned in front of the windshield 12.

Calculation means built in the camera 29b identifies a type of the subject contained in imaged data acquired by the camera 29b through pattern matching that uses the imaged data.

A subject may be a moving object or a stationary object. Examples of the moving object include a pedestrian, a bicycle, and a vehicle (automobile). Examples of the stationary object include a sign board, a utility pole, a tree, and a guard rail.

As described later, based on a change in position of the subject detected from the imaged data, it can be determined which of the moving object and the stationary object the subject is.

The camera 29b is also capable of imaging (recognizing) left and right white lines (lane markers) of a road. The calculation means built in the camera 29b calculates the shape of the road and a positional relationship between the road and the vehicle 10. The calculation means of the camera 29b calculates a positional relationship between the road and the subject. In other words, the calculation means of the camera 29b recognizes whether or not the subject is positioned between left and right white lines of a travel lane of the road.

Information acquired in this manner by the surroundings sensor 28 is herein referred to as "target information".

As illustrated in FIG. 2, the collision avoidance support device according to this embodiment includes the support ECU 30, the brake ECU 40, the steering ECU 50, and the alert ECU 60.

The respective ECUs 30, 40, 50, and 60 include microcomputers as main components, and are mutually connected to one another via a controlled area network (CAN) (not shown) for reception and transmission of various types of control information and request signals. "ECU" is an abbreviation of electric control unit. The microcomputer herein includes a CPU and storage devices (e.g., a ROM and a RAM), and the CPU is configured to implement various functions by executing instructions (programs) stored in the ROM.

The support ECU 30 is connected to the wheel speed sensors 25, the yaw rate sensor 26, the acceleration sensor 27, and the surroundings sensor 28.

The wheel speed sensors 25, the yaw rate sensor 26, the acceleration sensor 27, and the surroundings sensor 28 are configured to repeatedly transmit their detection results to the support ECU 30 at predetermined cycles (intervals).

As described later, the support ECU 30 determines, based on the imaged data transmitted from the surroundings sensor 28, whether or not the vehicle 10 is highly likely to collide with the subject (obstacle), which is a target within the imaged data. Then, when it is determined that "the vehicle 10 is highly likely to collide with the subject", the support ECU 30 controls the brake ECU 40, the steering ECU 50, and the alert ECU 60. A specific method of controlling the brake ECU 40, the steering ECU 50, and the alert ECU 60 by the support ECU 30 is described later.

The brake ECU 40 is connected to the brake actuator 23.

Thus, even in a case where the brake pedal is not stepped on, when the brake actuator 23 receives an operation signal from the brake ECU 40, the brake actuator 23 supplies the hydraulic fluid to each of the friction brake mechanisms 22. Accordingly, also in this case, each of the friction brake mechanisms 22 applies braking forces to the corresponding front wheels 16FW and the corresponding rear wheels 16RW.

The steering ECU 50 is a device configured to control the electric power steering mechanism, and is connected to the electric motor 18 and the steering torque sensor 19.

As described above, when the driver operates the steering wheel 15 for rotation, the steering ECU 50 controls the electric motor 18 for rotation to execute a steering assist.

Further, in a case where the driver does not operate the steering wheel 15 for rotation, when the steering ECU 50 receives an operation signal for collision avoidance transmitted from the support ECU 30, the steering ECU 50 controls the electric motor 18 for rotation in accordance with the operation signal to steer the front wheels 16FW.

The alert ECU 60 is connected to the buzzer 20 and the display 21.

When the vehicle 10 is highly likely to collide with the subject, the alert ECU 60 operates in accordance with an operation signal transmitted from the support ECU 30. Specifically, the alert ECU 60 causes the buzzer 20 to beep to alert the driver to the possibility of collision, and causes the display 21 to display an operation state of the collision avoidance support control.

Next, functions of the support ECU 30 are described.

From the functional viewpoint of the support ECU 30, the support ECU 30 includes a lane recognition unit 31, a vehicle track calculation unit 32, a subject track calculation unit 33, an obstacle determination unit 34, a collision determination unit 35, a target deceleration calculation unit 36, an avoidance target track calculation unit 37, and a control unit 38.

The lane recognition unit 31 is configured to generate information on a road on which the vehicle 10 travels based on the target information transmitted from the surroundings sensor 28. For example, the lane recognition unit 31 uses a two-dimensional coordinate system having an origin at a center of the front end of the vehicle 10 and extending in the left and right directions and the front direction from the origin to generate coordinate information (positional information) on each of ground, the subject, and the left and right white lines of the road. In this manner, the lane recognition unit 31 recognizes the shape of the travel lane of the vehicle 10 defined by the left and right white lines, the position and direction of the vehicle 10 within the travel lane, and relative positions of the ground and the subject (reflector, which may be an obstacle) with respect to the vehicle 10. The lane recognition unit 31 updates the coordinate information every time the lane recognition unit 31 receives the target information transmitted from the surroundings sensor 28.

The vehicle track calculation unit 32 is configured to calculate a turning radius of the vehicle 10 based on the yaw rate detected by the yaw rate sensor 26 and a vehicle speed, which is calculated through use of the wheel speeds detected by the wheel speed sensors 25. The vehicle track calculation unit 32 is further configured to calculate a track of the vehicle 10 based on the calculated turning radius. The track of the vehicle 10 is a change in position of the vehicle 10 during a period of time from a current time until a predetermined period of time passes, and has a predetermined width orthogonal in plan view to a traveling direction of the vehicle 10. The track of the vehicle 10 calculated in this manner is hereinafter referred to as "predicted vehicle track".

The subject track calculation unit 33 is configured to determine, based on information on a change in position of the subject acquired from the imaged data, which of the moving object and the stationary object the subject is. In other words, the subject track calculation unit 33 determines the type of the subject.

Specifically, when the camera 29b identifies the type of the subject within the imaged data through pattern matching, the camera 29b assigns an individual ID (identification information) to each subject. Then, the subject track calculation unit 33 uses the ID to identify each subject within the imaged data, and determines whether or not each subject has changed its position within a predetermined period of time. For example, when a given subject has changed its position within the predetermined period of time, the subject track calculation unit 33 determines that "this subject is a moving object". Meanwhile, when a given subject has not changed its position within the predetermined period of time, the subject track calculation unit 33 determines that "this subject is a stationary object".

Further, when the subject is the moving object, the subject track calculation unit 33 calculates the track of the subject. For example, a moving speed of the subject in the front-and-rear direction (traveling direction of the vehicle 10) can be calculated based on the vehicle speed of the vehicle 10 and the relative speed between the vehicle 10 and the subject. A moving speed of the subject in the left-and-right direction can be calculated based on an amount of change in distance between a position of a side end of the subject and the white line, which is detected by the surroundings sensor 28, for example. The subject track calculation unit 33 calculates, based on the moving speeds of the subject in the front-and-rear direction and the left-and-right direction, a track of the subject, which is a change in position of the subject (target) during a period of time from the current time until a predetermined period of time passes. The track of the subject calculated in this manner is hereinafter referred to as "predicted target track". Alternatively, the subject track calculation unit 33 may calculate the predicted target track based on the calculated predicted vehicle track of the vehicle 10 and the distance between the vehicle 10 and the subject, which is detected by the surroundings sensor 28.

The obstacle determination unit 34 is configured to determine, based on the predicted vehicle track of the vehicle 10 and the predicted target track of the subject being the moving object, whether or not the vehicle 10 is likely to collide with the subject when the subject keeps a current movement state and the vehicle 10 keeps a current traveling state (that is, the speed and steering angles of the vehicle 10). In other words, the obstacle determination unit 34 determines that the vehicle 10 is likely to collide with the subject when the predicted vehicle track and the predicted target track interfere with each other.

The obstacle determination unit 34 is further configured to determine, based on the predicted vehicle track of the vehicle 10 and the position of the subject being the stationary object, whether or not the vehicle 10 is likely to collide with the subject when the subject keeps a stationary state and the vehicle 10 keeps the current traveling state. In other words, the obstacle determination unit 34 determines that the vehicle 10 is likely to collide with the subject when the predicted vehicle track of the vehicle 10 and the position of the subject interfere with each other.

When determining that the vehicle 10 is likely to collide with the subject, the obstacle determination unit 34 identifies the subject as an obstacle.

The result of determination made by the obstacle determination unit 34 as to whether or not the subject (target) is the obstacle is used for the alert control and the automatic brake control, which are described later. In other words, when the obstacle determination unit 34 determines that the subject positioned in front of the vehicle 10 is the obstacle, the alert control and the automatic brake control are executed.

The obstacle determination unit 34 determines whether or not the subject (target) is the obstacle using two types of methods.

The result of determination made by one of the methods is used for a determination on whether or not the alert control should be executed. Hereinafter, this determination method used by the obstacle determination unit 34 is referred to as "a first determination method".

The result of determination made by the other of the methods is used for a determination on whether or not the automatic brake control should be executed. Hereinafter, this determination method used by the obstacle determination unit 34 is referred to as "a second determination method".

Figure 3:
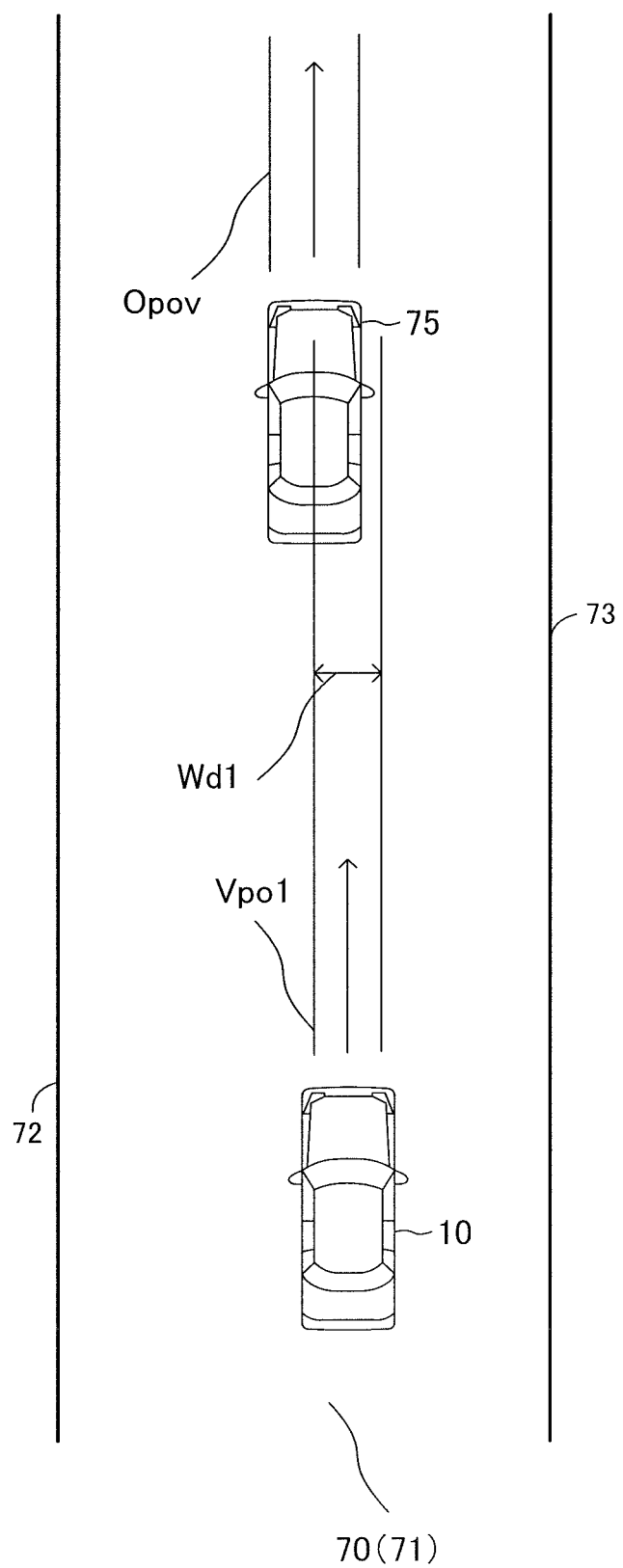
FIG. 3 is a plan view for illustrating an outline of a method to determine whether or not a vehicle positioned in front of the vehicle, which has the collision avoidance support device and is travelling on a straight travel lane, is an obstacle. This method is executed before the collision avoidance support device determines whether or not alert control should be executed.

FIG. 3 illustrates an outline of the first determination method.

A straight road 70 has only one travel lane 71. That is, the road 70 is a one-way road. The vehicle 10 travels on the road 70 in a direction of the arrow. White lines 72 and 73 are drawn on left and right side ends of the travel lane 71. A vehicle 75 positioned in front of the vehicle 10 is travelling on the travel lane 71 in the direction of the arrow.

The vehicle track calculation unit 32 is configured to calculate a turning radius of the vehicle 10 based on the yaw rate and the vehicle speed. The vehicle track calculation unit 32 is further configured to calculate a first vehicle predicted track Vpo1 based on the calculated turning radius. A width of this first vehicle predicted track Vpo1 is Wd1. As illustrated in FIG. 1, a direction of the width Wd1 is orthogonal in plan view to a traveling direction of the vehicle 10. The width Wd1 is shorter than the entire width of the vehicle 10. Specially, the left end of this first vehicle predicted track Vpo1 is positioned on the right side with respect to the left end of the vehicle 10, and the right end of the first vehicle predicted track Vpo1 is positioned on the left side with respect to the right end of the vehicle 10.

Meanwhile, the subject track calculation unit 33 is configured to calculate a target predicted track Opov of the vehicle 75 being a moving object. A direction of a width of the target predicted track Opov is orthogonal in plan view to a traveling direction of the vehicle 75. The width of the target predicted track Opov is equal to the entire width of the vehicle 75.

When a left-and-right direction position (vehicle width direction position) of a part of the first vehicle predicted track Vpo1 and that of a part of the target predicted track Opov are coincident with each other (interfere with each other), the obstacle determination unit 34 determines that the vehicle 75 is an obstacle.

In FIG. 3, since a part of the first vehicle predicted track Vpo1 and a part of the target predicted track Opov interfere with each other, the obstacle determination unit 34 determines that the vehicle 75 is an obstacle.

Figure 4:
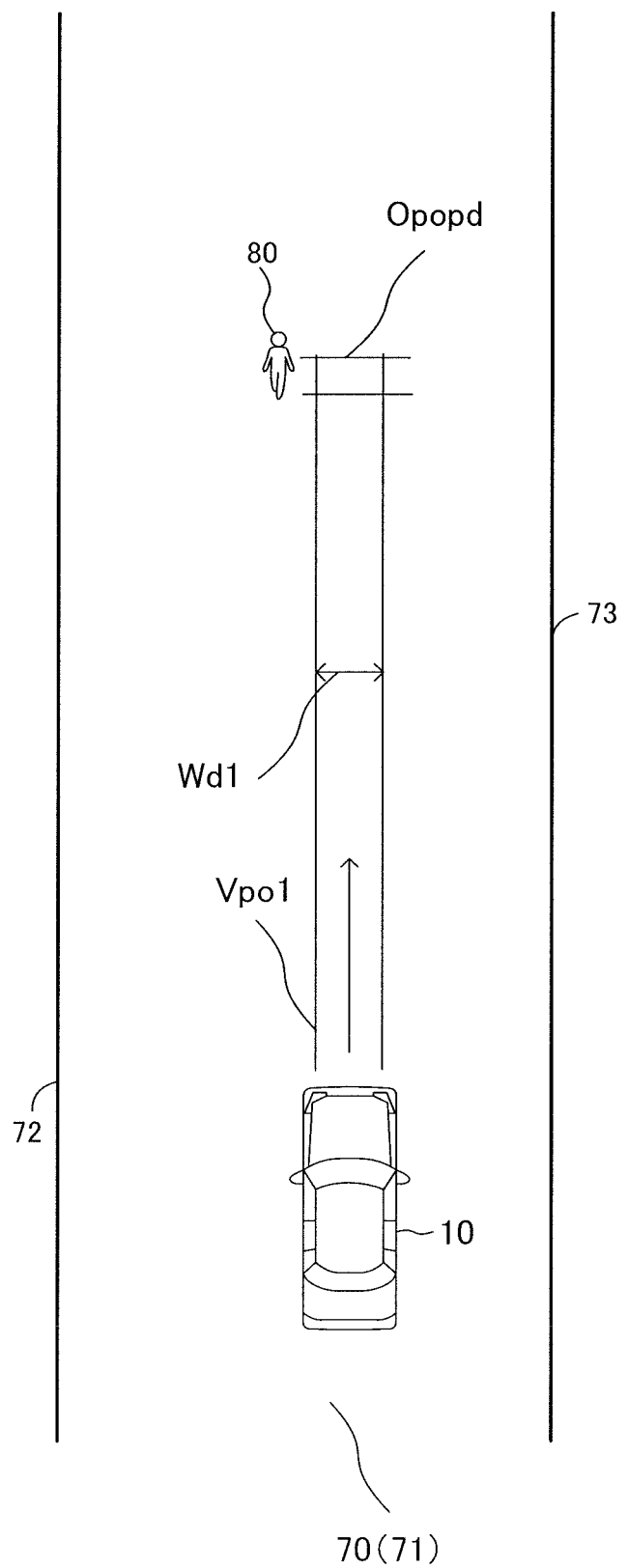
FIG. 4 is a plan view for illustrating an outline of a method to determine whether or not a pedestrian positioned in front of the vehicle, which has the collision avoidance support device and is travelling on the straight travel lane, is an obstacle. This method is executed before the collision avoidance support device determines whether or not the alert control should be executed.

FIG. 4 also illustrates the outline of the first determination method.

A pedestrian 80 is positioned on the travel lane 71. That is, the pedestrian 80 is positioned between the left white line 72 and the right white line 73. The pedestrian 80 is positioned in front of the vehicle 10. This pedestrian 80 is going across the travel lane 71 from the left side thereof to the right side thereof. That is, this pedestrian 80 is a moving object.

The subject track calculation unit 33 is configured to calculate a target predicted track Opopd of the pedestrian 80 being a moving object. A direction of a width of the target predicted track Opopd is orthogonal in plan view to a moving direction of the pedestrian 80. The width of the target predicted track Opopd is equal to the entire width of the pedestrian 80.

When, for example, the pedestrian 80 moves on the travel lane 71 in a direction parallel to the traveling direction of the vehicle 10, the target predicted track Opopd is parallel to the traveling direction of the vehicle 10.

When a left-and-right direction position (vehicle width direction position) of a part of the first vehicle predicted track Vpo1 and that of a part of the target predicted track Opopd are coincident with each other (interfere with each other), the obstacle determination unit 34 determines that the pedestrian 80 is an obstacle.

In FIG. 4, since a part of the first vehicle predicted track Vpo1 and a part of the target predicted track Opopd interfere with each other, the obstacle determination unit 34 determines that the pedestrian 80 is an obstacle.

Figure 5:
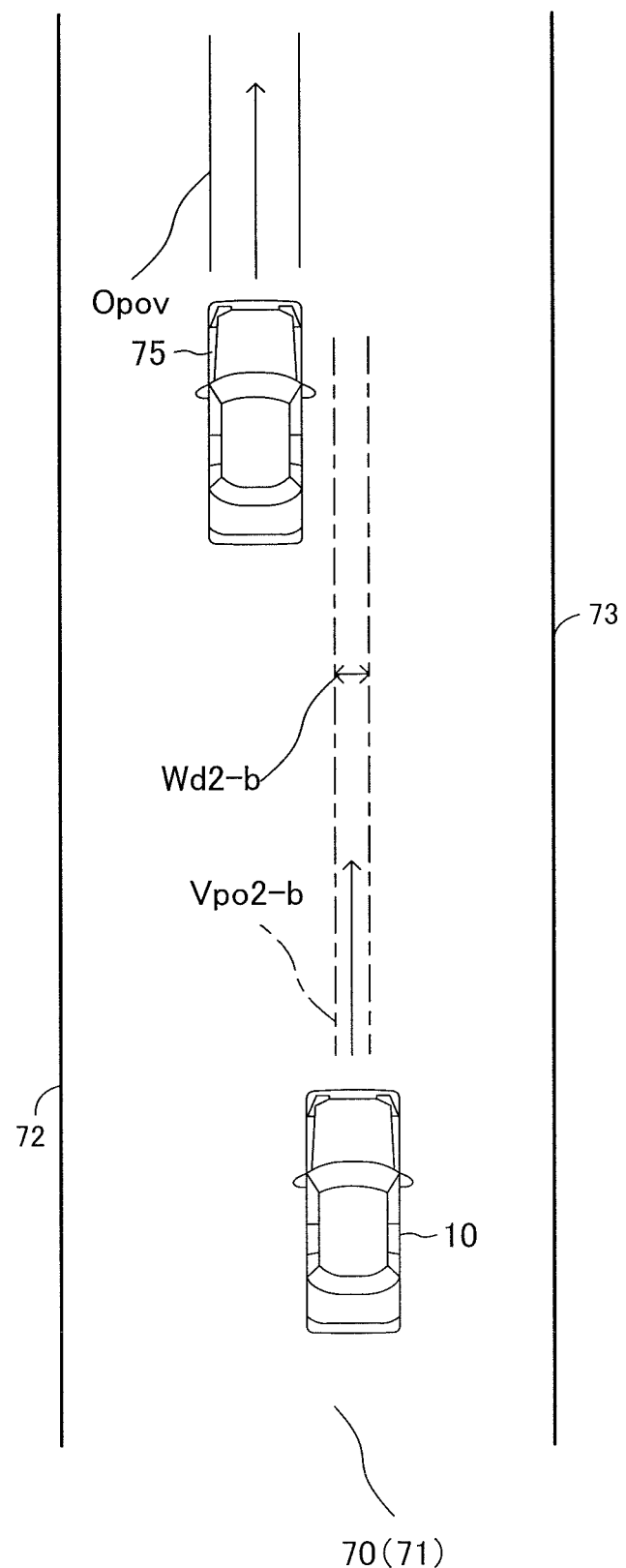
FIG. 5 is a plan view for illustrating an outline of a method to determine whether or not the vehicle positioned in front of the vehicle, which has the collision avoidance support device and is travelling on the straight travel lane, is an obstacle. This method is executed before the collision avoidance support device determines whether or not automatic brake control should be executed.

Meanwhile, FIG. 5 illustrates an outline of the second determination method.

In this case, the vehicle track calculation unit 32 is configured to calculate a turning radius of the vehicle 10 based on the yaw rate and the vehicle speed. The vehicle track calculation unit 32 is further configured to calculate a second vehicle predicted track Vpo2-b based on the calculated turning radius. A width of this second vehicle predicted track Vpo2-b is Wd2-b. A direction of the width Wd2-b is orthogonal in plan view to the traveling direction of the vehicle 10. As illustrated in FIG. 1, the width Wd2-b is shorter than the entire width of the vehicle 10 and the width Wd1 of the first vehicle predicted track Vpo1. The left end of this second vehicle predicted track Vpo2-b is positioned on the right side with respect to the left end of the vehicle 10, and the right end of the second vehicle predicted track Vpo2-b is positioned on the left side with respect to the right end of the vehicle 10.

When a left-and-right direction position (vehicle width direction position) of a part of the second vehicle predicted track Vpo2-b and that of a part of the target predicted track Opov are coincident with each other (interfere with each other), the obstacle determination unit 34 determines that the vehicle 75 is an obstacle.

In FIG. 5, since the second vehicle predicted track Vpo2-b and the target predicted track Opov do not interfere with each other, the obstacle determination unit 34 does not determine that the vehicle 75 is an obstacle.

Figure 6:
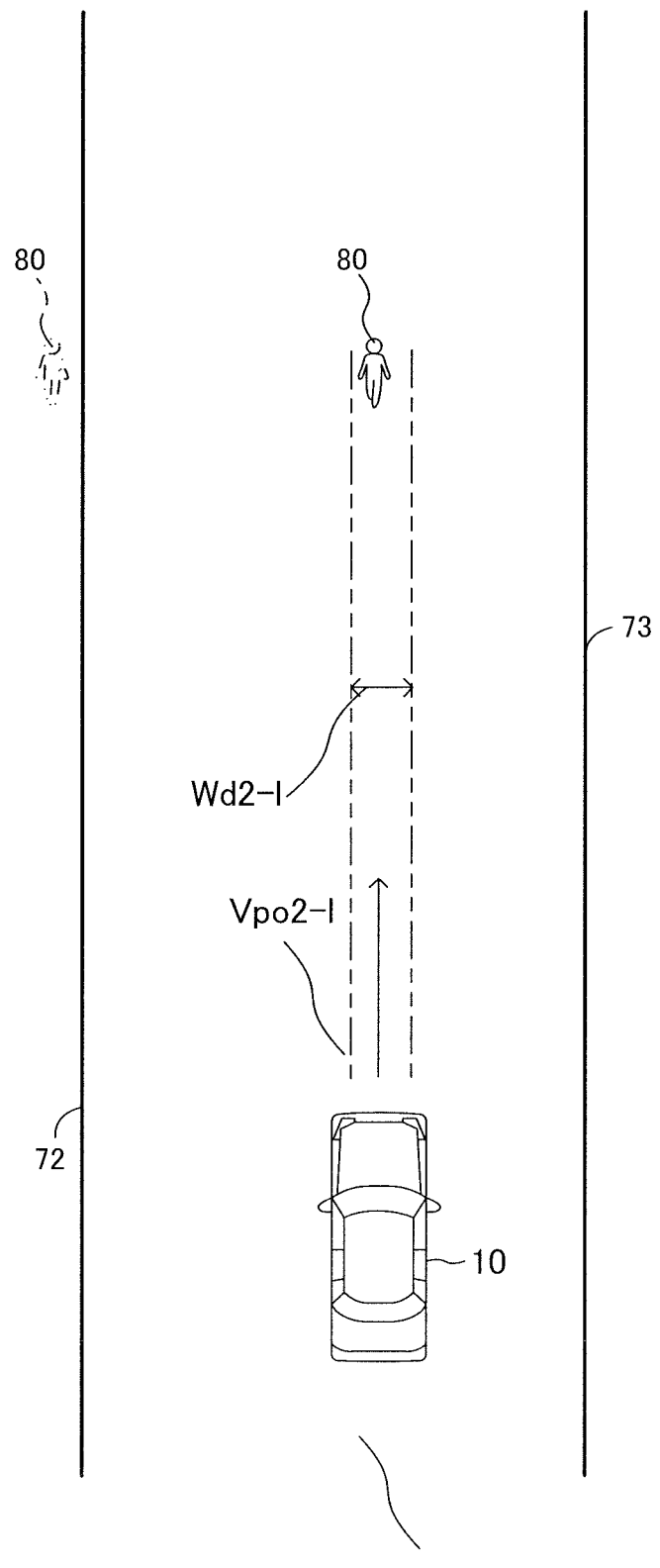
FIG. 6 is a plan view for illustrating an outline of a method to determine whether or not the pedestrian positioned in front of the vehicle, which has the collision avoidance support device and is travelling on the straight travel lane, is an obstacle. This method is executed before the collision avoidance support device determines whether or not the automatic brake control should be executed.

FIG. 6 also illustrates the outline of the second determination method.

A pedestrian 80 positioned on the road 70 stands still. That is, this pedestrian 80 is a stationary object. The pedestrian 80 is positioned between the left white line 72 and the right white line 73.

In this case, the vehicle track calculation unit 32 is configured to calculate a turning radius of the vehicle 10 based on the yaw rate and the vehicle speed. The vehicle track calculation unit 32 is further configured to calculate a second vehicle predicted track Vpo2-l based on the calculated turning radius. A width of this second vehicle predicted track Vpo2-l is Wd2-l. A direction of the width Wd2-l is orthogonal in plan view to the traveling direction of the vehicle 10. As illustrated in FIG. 1, the width Wd2-l is shorter than the entire width of the vehicle 10 and is longer than the width Wd2-b. It should be noted that the width Wd2-l may be shorter than the width Wd1, or may be equal to or longer than the width Wd1. The left end of the second vehicle predicted track Vpo2-l is positioned on the right side with respect to the left end of the vehicle 10, and the right end of the second vehicle predicted track Vpo2-l is positioned on the left side with respect to the right end of the vehicle 10.

When a left-and-right direction position (vehicle width direction position) of a part of the second vehicle predicted track Vpo2-l and that of a part of the pedestrian 80 are coincident with each other (interfere with each other), the obstacle determination unit 34 determines that the pedestrian 80 is an obstacle.

In FIG. 6, since a part of the second vehicle predicted track Vpo2-l and a part of the pedestrian 80 interfere with each other, the obstacle determination unit 34 determines that the pedestrian 80 is an obstacle.

As described above, in the second determination method, only when the target positioned in front of the vehicle 10 is the pedestrian 80 positioned between the left white line 72 and the right white line 73, the vehicle track calculation unit 32 calculates the second vehicle predicted track Vpo2-l.

In other words, in the second determination method, the vehicle track calculation unit 32 calculates the second vehicle predicted track Vpo2-b when, for example, the vehicle 75 is positioned in front of the vehicle 10, and the pedestrian 80 is positioned on the left side with respect to the left white line 72 (is positioned outside of the travel lane 71) as illustrated by the virtual line of FIG. 6.

It should be noted that, when the target positioned in front of the vehicle 10 is the pedestrian 80 positioned between the left white line 72 and the right white line 73 of the road 70, the obstacle determination unit 34 determines that a predetermined enlargement condition is satisfied. In other words, when the enlargement condition is satisfied, the obstacle determination unit 34 sets the width Wd2-l of the second vehicle predicted track Vpo2-l to the value larger than the width Wd2-b of the second vehicle predicted track Vpo2-b of when the enlargement condition is not satisfied. That is, the obstacle determination unit 34 enlarges a collision avoidance support area of when the automatic brake control is executed.

Figure 7:
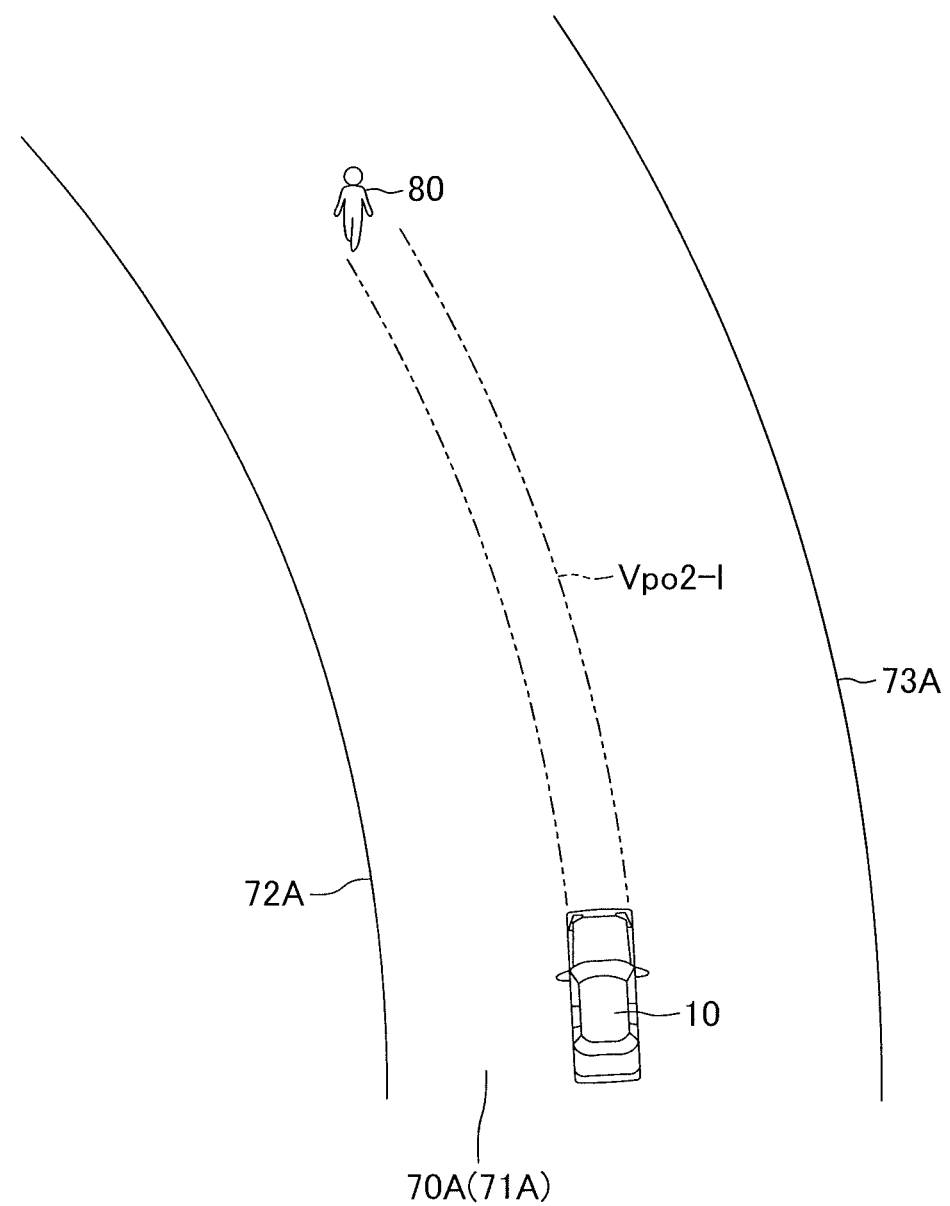
FIG. 7 is a plan view for illustrating an outline of a method to determine whether or not the pedestrian positioned in front of the vehicle, which has the collision avoidance support device and is travelling on a curved travel lane, is an obstacle. This method is executed before the collision avoidance support device determines whether or not the automatic brake control should be executed.

Noted that FIG. 7 illustrates the case where the vehicle 10 travels on a road 70A having a curved shape.

This road 70A has only one travel lane 71A. That is, the road 70A is a one-way road. The vehicle 10 travels on the road 70A in a direction of the arrow. White lines 72A and 73A are drawn on left and right side ends of the travel lane 71A. A pedestrian 80 being a stationary object is positioned on the travel lane 71A.

In this case, the vehicle track calculation unit 32 is configured to calculate a turning radius of the vehicle 10 based on the yaw rate and the vehicle speed. The vehicle track calculation unit 32 is further configured to calculate the second vehicle predicted track Vpo2-l based on the calculated turning radius. The planar shape of this second vehicle predicted track Vpo2-I is a curved shape extending in a direction parallel to a travelling direction of the vehicle 10. A direction of the width Wd2-I of this second vehicle predicted track Vpo2-I is orthogonal in plan view to the traveling direction of the vehicle 10.

It should be noted that, planner shapes of the first vehicle predicted track Vpo1 and the second vehicle predicted track Vpo2-b, which are calculated by the vehicle track calculation unit 32 when the vehicle 10 travels on the road 70A, are, however not illustrated, curved shapes extending in a direction parallel to a travelling direction of the vehicle 10.

The collision determination unit 35 is configured to calculate, based on a distance L between the obstacle and the vehicle 10 and a relative speed Vr of the vehicle 10 with respect to the obstacle transmitted from the surroundings sensor 28, a predicted time to collision TTC, which is a predicted period of time until the vehicle 10 collides with the obstacle, through Expression (1) given below.

$$TTC=L/Vr \tag{1}$$

When the predicted time to collision TTC is equal to or shorter than a collision determination threshold time set in advance, the collision determination unit 35 determines that the vehicle 10 is highly likely to collide with the obstacle.

In this embodiment, two types of collision determination threshold times are used. Specifically, a first collision determination threshold time TTCth1 or a second collision determination threshold time TTCth2 is used as the collision determination threshold time. The second collision determination threshold time TTCth2 is shorter than the first collision determination threshold time TTCth1.

When the predicted time to collision TTC becomes equal to or shorter than the first collision determination threshold time TTCth1 under a state in which the obstacle determination unit 34 determines that "the subject (target) positioned in front of the vehicle 10 is an obstacle" with using the first determination method, the collision determination unit 35 determines that "the vehicle 10 is highly likely to collide with the obstacle".

Then, the alert ECU 60 receives the operation signal from the support ECU 30, and causes the buzzer 20 and the display 21 to operate for a predetermined period of time. Specifically, for the predetermined period of time, the buzzer 20 beeps and the display 21 displays an operation state of the collision avoidance support control.

The target deceleration calculation unit 36 is configured to calculate a target deceleration at which the vehicle 10 is to be decelerated when the obstacle determination unit 34 determines that "the subject (target) positioned in front of the vehicle 10 is an obstacle" with using the second determination method.

For example, in a case where the obstacle is a stationary object, when the vehicle speed (=relative speed) of the vehicle 10 at the current time is represented by V, the deceleration of the vehicle 10 is represented by a, and a period of time until the vehicle 10 stops (that is, a period of time until the vehicle speed becomes zero) is represented by t, a travel distance X until the vehicle 10 stops can be expressed by Expression (2) given below.

$$X=V \cdot t+(\tfrac{1}{2}) \cdot a \cdot t^2 \tag{2}$$

The period of time t until the vehicle 10 stops can be expressed by Expression (3) given below.

$$t=-V/a \tag{3}$$

Accordingly, through substitution of Expression (3) into Expression (2), the deceleration a required for stopping the vehicle 10 when the vehicle 10 travels for a travel distance D can be expressed by Expression (4) given below.

$$a=-V^2/2D \tag{4}$$

In order to stop the vehicle 10 at a position separated by a distance l3 from the obstacle toward the vehicle 10, it is only necessary to set the travel distance D to a distance (L-β) obtained by subtracting the distance β from the distance L detected by the surroundings sensor 28. When the obstacle is a moving object, it is only necessary to calculate the deceleration a by using the relative speed Vr in place of the vehicle speed V.

The target deceleration calculation unit 36 sets the deceleration a calculated in this manner as the target deceleration. There is a limit value to the deceleration of the vehicle 10 (e.g., approximately −1 G). Thus, when an absolute value of the calculated target deceleration is larger than a limit value (upper limit value) set in advance, the target deceleration calculation unit 36 sets the limit value as the absolute value of the target deceleration.

When the predicted time to collision TTC becomes equal to or shorter than the second collision determination threshold time TTCth2 after the alert ECU 60 causes the buzzer 20 and the display 21 to operate, the collision determination unit 35 determines that "the vehicle 10 is highly likely to collide with the obstacle".

Then, the control unit 38 transmits to the brake ECU 40 an operation signal indicating the target deceleration calculated by the target deceleration calculation unit 36. The brake ECU 40 then controls the brake actuator 23 based on the target deceleration. The friction brake mechanisms 22 then apply friction braking forces to the front wheels 16FW and the rear wheels 16RW. In other words, the automatic brake control is executed.

The avoidance target track calculation unit 37 is configured to calculate an avoidance target track (avoidance path) through which the vehicle 10 may pass to avoid collision with the obstacle when the obstacle determination unit 34 determines that "the subject (target) positioned in front of the vehicle 10 is an obstacle" with using the second determination method.

Figure 8:
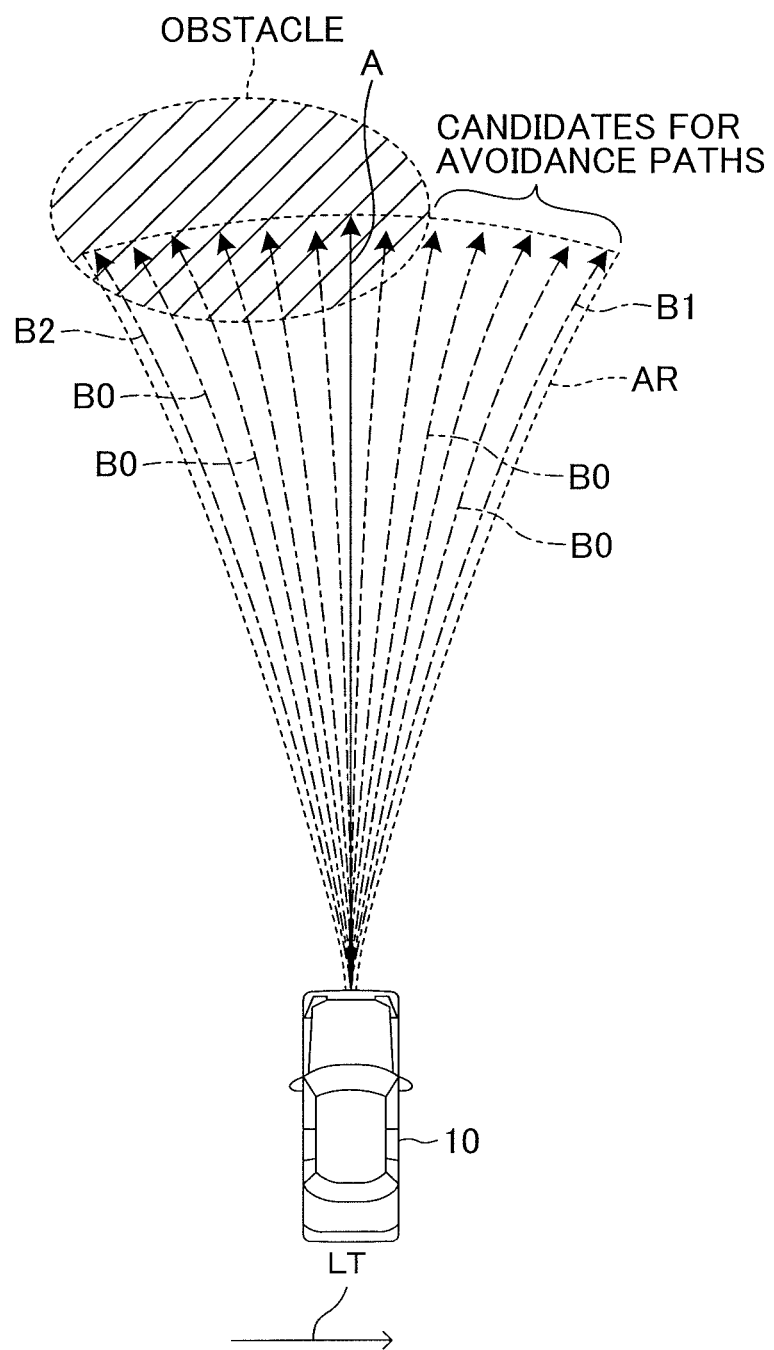
FIG. 8 is a plan view for illustrating avoidance paths of the vehicle.

For example, as illustrated in FIG. 8, the avoidance target track calculation unit 37 calculates (identifies) a path A through which the vehicle 10 passes when it is assumed that the vehicle 10 travels while keeping the current travel state. Specifically, the avoidance target track calculation unit 37 calculates the current path A based on a lateral acceleration Gy0 currently acting on the vehicle 10 in a direction of an arrow LT. Then, the avoidance target track calculation unit 37 identifies a path B1 through which the vehicle 10 is predicted to pass when a maximum change amount ΔGy of a lateral force that may act on the vehicle 10 is added to the current lateral acceleration Gy0. The maximum change amount ΔGy is a maximum value of a change amount of the lateral force that does not inhibit the vehicle 10 from safely turning at the vehicle speed at the current time. The avoidance target track calculation unit 37 further calculates (identifies) a path B2 through which the vehicle 10 is predicted to pass when the maximum change amount ΔGy is subtracted from the lateral acceleration Gy0 of the vehicle 10 at the current time.

The avoidance target track calculation unit 37 calculates a plurality of paths B0, which are each obtained by changing the lateral acceleration by a fixed amount, within a range AR of from the path B1 to the path B2 in order from, for example, the path B1 to the path B2. Specifically, the avoidance target track calculation unit 37 reduces a change amount of the lateral acceleration from the lateral acceleration corresponding to the path B1 by a fixed amount each in order, to thereby calculate the plurality of paths B0 in order from the path B1 to the path B2.

Further, the avoidance target track calculation unit 37 identifies, among the path B1, the path B2, and the paths B0, a path whose distance to the obstacle in a width direction of the road on which the vehicle 10 travels is larger than a predetermined limit value VI, as a selected avoidance path that is an avoidance path through which the vehicle 10 is to travel. For example, first, the avoidance target track calculation unit 37 compares the distance between the path B1 and the obstacle with the limit value VI. When determining that the distance is larger than the limit value VI, the avoidance target track calculation unit 37 identifies the path B1 as the selected avoidance path.

The selected avoidance path is set within a range in which the vehicle 10 does not depart from the travel lane on which the vehicle 10 is traveling and in which the ground is confirmed to be formed.

After identification of the selected avoidance path, the avoidance target track calculation unit 37 calculates a target yaw rate for causing the vehicle 10 to travel along the selected avoidance path.

The collision determination unit 35 determines whether or not "the travel distance X calculated based on an actual deceleration a and vehicle speed V at the current time is larger than a value (L0-β) obtained by subtracting β from a distance L0 from the vehicle 10 to the obstacle at the current time". Then, when the travel distance X is larger than the value (L0-β), the collision determination unit 35 determines that "the vehicle 10 is highly likely to collide with the obstacle".

The control unit 38 then calculates a target steering angle at which the target yaw rate calculated by the avoidance target track calculation unit 37 can be obtained based on the target yaw rate and the vehicle speed of the vehicle 10. The control unit 38 then transmits an operation signal indicating the target steering angle to the steering ECU 50. The steering ECU 50 then drives the electric motor 18 based on the target steering angle to steer the front wheels 16FW and the rear wheels 16RW. In other words, the control unit 38 executes the automatic steering control for causing the vehicle 10 to travel along the selected avoidance path.

In this embodiment, the automatic brake control by the brake ECU 40 and the automatic steering control by the steering ECU 50 terminate at the same time when the collision determination unit 35 determines that "a predetermined control termination condition is satisfied". In this case, the control unit 38 transmits stop signals to the brake ECU 40 and the steering ECU 50.

In a case where the vehicle speed of the vehicle 10 is zero, even when the driver does not steer the steering wheel 15, the vehicle 10 is unlikely to depart from the travel lane on which the vehicle 10 is traveling to an adjacent travel lane. Accordingly, in this embodiment, the control termination condition is satisfied when the vehicle speed of the vehicle 10 becomes zero.

Further, in a case where the traveling direction of the vehicle 10 is parallel to the white lines of the travel lane on which the vehicle 10 is traveling, even when the driver does not steer the steering wheel 15, the vehicle 10 is unlikely to depart from the current travel lane to the adjacent travel lane.

Still further, when the distance in a width direction of the travel lane from the vehicle 10 to one of the left and right white lines of the travel lane on which the vehicle 10 is traveling is longer than the distance in the width direction from the vehicle 10 to the other white line, and the vehicle 10 is traveling not in parallel to the other white line while approaching the one white line, even when the driver does not steer the steering wheel 15, the vehicle 10 is unlikely to pass through the other white line to depart from the travel lane on which the vehicle 10 is traveling to the adjacent travel lane.

Accordingly, in this embodiment, the control termination condition is satisfied when the lane recognition unit 31 determines that "the traveling direction of the vehicle 10 is parallel to the white lines" or when the lane recognition unit 31 determines that "the distance in the width direction of the travel lane from the vehicle 10 to one of the left and right white lines of the travel lane on which the vehicle 10 is traveling is longer than the distance in the width direction from the vehicle 10 to the other white line, and the vehicle 10 is traveling not in parallel to the other white line while approaching the one white line".

As described above, in the present embodiment, the obstacle determination unit 34 determines that the enlargement condition is satisfied when the target positioned in front of the vehicle 10 is the pedestrian 80 positioned between the left and right white lines 72, 73 (72A, 73A) of the road 70 (70A). Then, when the enlargement condition is satisfied, the obstacle determination unit 34 sets the width Wd2-I of the second vehicle predicted track Vpo2-I to the value larger than the width Wd2-b of the second vehicle predicted track Vpo2-b of when the enlargement condition is not satisfied.

Thus, when the pedestrian 80 is positioned on the travel lane 71, the collision avoidance support device is easier to execute the automatic brake control compared with the case where the pedestrian 80 is positioned outside of the travel lane 71. In other words, when the pedestrian 80 is positioned outside of the travel lane 71, the collision avoidance support device is harder to execute the automatic brake control compared with the case where the pedestrian 80 is positioned on the travel lane 71.

When the pedestrian 80 is positioned on the travel lane 71, a risk that the vehicle 10 collides with the pedestrian 80 is larger compared with the case where the pedestrian 80 is positioned outside of the travel lane 71.

However, in this case, the obstacle determination unit 34 determines whether or not the pedestrian 80 is an obstacle with using the second vehicle predicted track Vpo2-I having the width larger than the second vehicle predicted track Vpo2-b. Thus, the collision avoidance support device can securely execute the automatic brake control having high necessity.

It should be noted that, when the collision avoidance support device executes the automatic brake control, the vehicle speed of the vehicle 10 is lowered. Thus, a risk that the vehicle 10 collides with the pedestrian 80 is securely reduced by the automatic steering control which is executed after the automatic brake control is started.

On the other hand, when the pedestrian 80 is positioned outside of the travel lane 71, a risk that the vehicle 10 collides with the pedestrian 80 is smaller compared with the case where the pedestrian 80 is positioned on the travel lane 71.

However, in this case, the collision avoidance support device determines whether or not the pedestrian 80 is an obstacle with using the second vehicle predicted track Vpo2-b having a narrow width. Thus, a risk that the collision avoidance support device executes the automatic brake control having low necessity is small. Further, a risk that the collision avoidance support device executes the automatic steering control having low necessity is also small.

Next, referring to flowcharts of FIG. 9 to FIG. 15, specific processing performed by the support ECU 30, the brake ECU 40, the steering ECU 50, and the alert ECU 60 is described.

Figure 9:
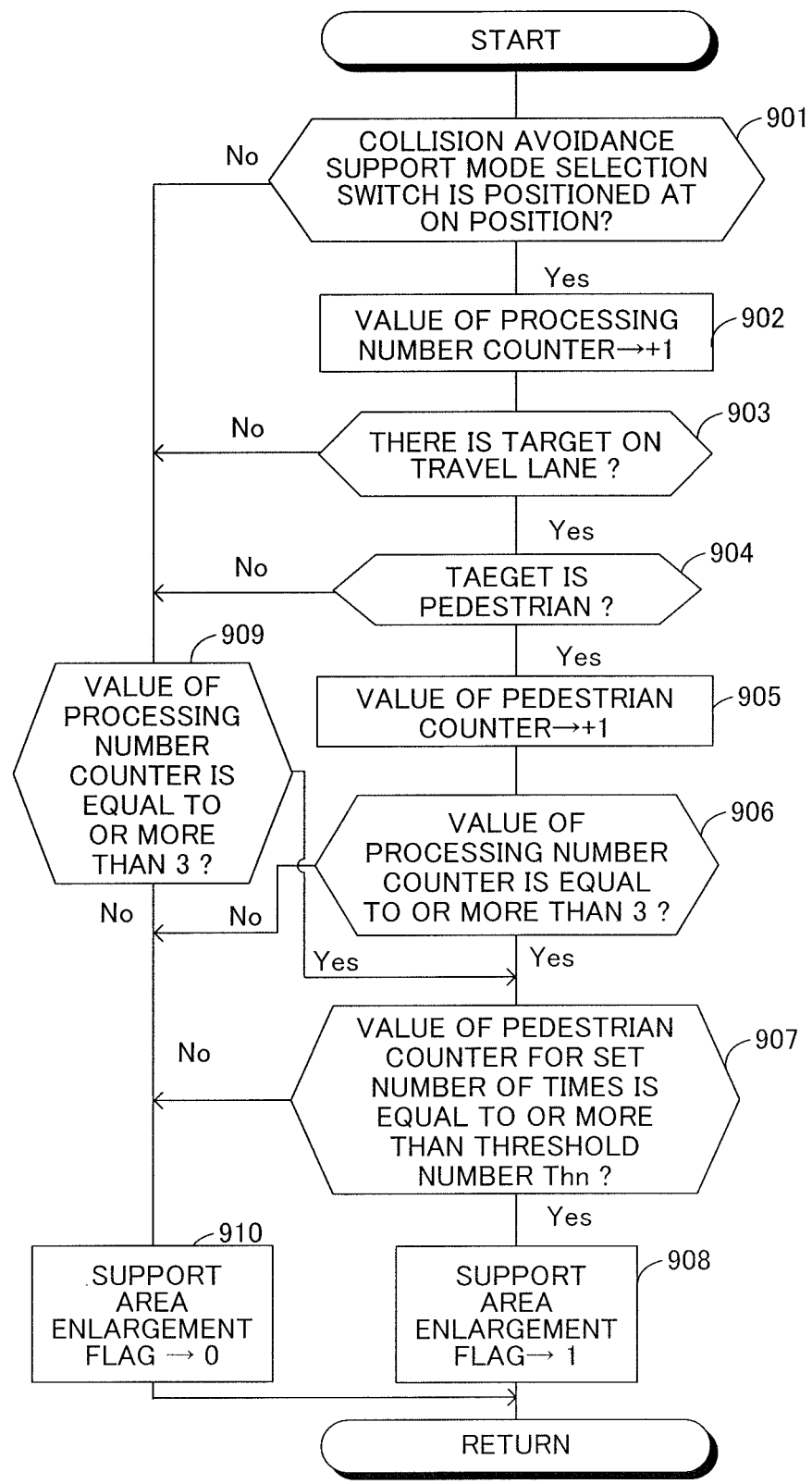
FIG. 9 is a flowchart for illustrating processing to be executed by a support ECU.

When a position of an ignition switch (not shown) of the vehicle 10 is switched from an off position to an on position through an operation of the ignition switch (not shown), the support ECU 30 repeatedly executes a routine illustrated in the flowchart of FIG. 9 every time a predetermined period of time passes.

First, in Step 901, the support ECU 30 determines whether or not the collision avoidance support mode selection switch is positioned at the on position.

When determining "Yes" in Step 901, the support ECU 30 proceeds to Step 902 to add "1" to the value of a processing number counter.

When finishing the processing of Step 902, the support ECU 30 proceeds to Step 903, and the lane recognition unit 31 determines whether or not the target is positioned between the left and right white lines of the travel lane based on target information. It should be noted that, the surroundings sensor 28 repeatedly obtains target information at a predetermined time interval equal to or less than a time interval in which the support ECU 30 executes the routine of FIG. 9. Thus, the target information, to which the lane recognition unit 31 refers in Step 903, differs according to processing time of Step 903.

When, for example, a target (the vehicle 75, the pedestrian 80) is positioned between the left and right white lines 72, 73 (72A, 73A) of the travel lane 71 (71A) as illustrated in FIGS. 3 through 7, the support ECU 30 determines "Yes" in Step 903.

Meanwhile, when, for example, a target (the pedestrian 80) is positioned on the left side with respect to the white lines 72 as illustrated by the virtual line of FIG. 6, the support ECU 30 determines "No" in Step 903.

When determining "Yes" in Step 903, the support ECU 30 proceeds to Step 904, and the obstacle determination unit 34 determines whether or not the target positioned between the left and right white lines 72, 73 (72A, 73A) is a pedestrian by referring to target information. It should be noted that, the target information, to which the obstacle determination unit 34 refers in Step 904, differs according to processing time of Step 904.

When, for example, the pedestrian 80 is positioned between the left and right white lines 72, 73 (72A, 73A) as illustrated in FIGS. 4, 6, and 7, the support ECU 30 determines "Yes" in Step 904.

When determining "Yes" in Step 904, the support ECU 30 proceeds to Step 905, and the obstacle determination unit 34 adds "1" to the value of a pedestrian counter.

When finishing the processing of Step 905, the support ECU 30 proceeds to Step 906 to determines whether or not the value of a processing number counter is equal to or more than "three".

When determining "Yes" in Step 906, the support ECU 30 proceeds to Step 907, and the obstacle determination unit 34 determines whether or not the value of the pedestrian counter is equal to or more than a predetermined threshold number Thn.

This threshold number Thn is recorded in a memory of the support ECU 30.

The obstacle determination unit 34 compares the value of the pedestrian counter that has been added in Step 905 during execution of the routine of this flowchart at the present time and execution of the routine of this flowchart, which was carried out a predetermined times consecutively before the execution of the routine at the present time, and the threshold number Thn. It should be noted that, in this way, the support ECU 30 executes the routine of this flowchart one time at the present time and executes the routine the predetermined times consecutively before the present time. The total number of this "one time" and "the predetermined times", is referred to as "set number of times". Examples of the set number of times is recorded in the memory of the support ECU 30.

When, for example, the support ECU 30 executes the processing of Step 905 three times (every time) while executing the routine of this flowchart the latest three times in the case where the threshold number Thn is set to "two times" and the set number of times is set to "three times", the obstacle determination unit 34 determines "Yes" in Step 907. Similarly, when the support ECU 30 executes the processing of Step 905 two times while executing the routine of this flowchart the latest three times, the obstacle determination unit 34 determines "Yes" in Step 907. In other words, in these cases, the obstacle determination unit 34 determines that the enlargement condition is satisfied.

Whereas, when the support ECU 30 executes the processing of Step 905 equal to or less than one time while executing the routine of this flowchart the latest three times, the obstacle determination unit 34 determines "No" in Step 907. In other words, in this case, the obstacle determination unit 34 determines that the enlargement condition is not satisfied.

The detection accuracy of the surroundings sensor 28 and the determination accuracy of the subject track calculation unit 33 may be low, and/or the detection accuracy of the lane recognition unit 31 may be low.

However, since the support ECU 30 determines whether or not the enlargement condition is satisfied using the plurality of processing results of the surroundings sensor 28, the subject track calculation unit 33, and the lane recognition unit 31, a risk that the enlargement condition is erroneously satisfied can be reduced compared with the case where the support ECU 30 determines whether or not the enlargement condition is satisfied using only one processing result.

The threshold number Thnr does not need to be "two (times)". That is, the threshold number Thnr may be a value other than two.

Similarly, the set number of times does not need to be "three (times)". That is, the set number of times may be a predetermined plural number (times).

It should be noted that, the period of time, which has passed while the support ECU 30 executes the routine of the flowchart in FIG. 9 the set number of times, is "period of time for determining condition satisfaction".

When finishing the processing of Step 907, the support ECU 30 proceeds to Step 908. Then, the obstacle determination unit 34 sets a support area enlargement flag to "1".

An initial value of the support area enlargement flag is "0".

When finishing the processing of Step 908, the support ECU 30 temporarily terminates the processing of this routine.

When determining "No" in Step 901, 903, or 904, the support ECU 30 proceeds to Step 909 to determine whether or not the value of the processing number counter is equal to or more than three.

When determining "Yes" in Step 909, the support ECU 30 proceeds to Step 907.

Meanwhile, when determining "No" in Step 906, 907, or 909, the support ECU 30 proceeds to Step 910 to set the support area enlargement flag to "0".

When finishing the processing of Step 910, the support ECU 30 temporarily terminates the processing of this routine.

Figure 10:
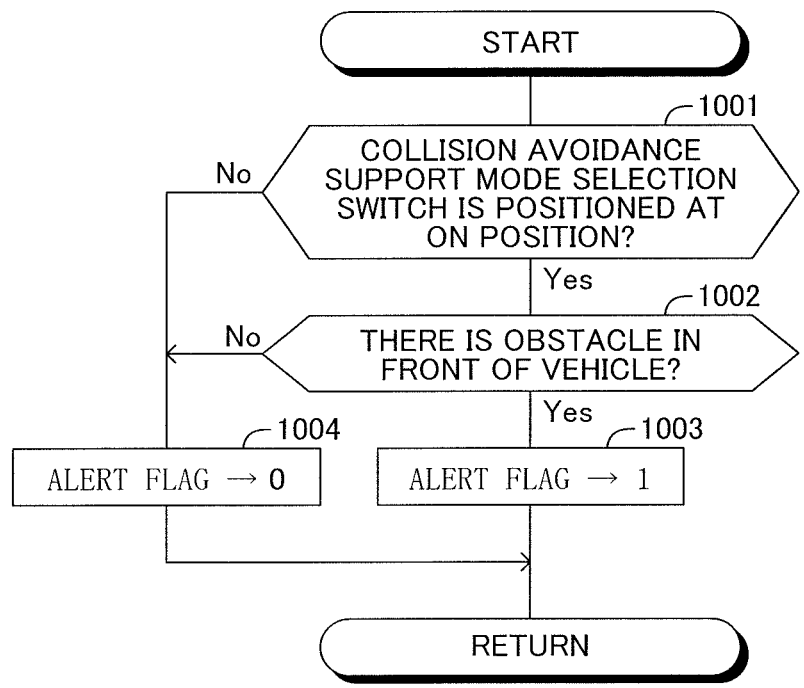
FIG. 10 is a flowchart for illustrating processing to be executed by the support ECU.

When the position of the ignition switch is switched from the off position to the on position, the support ECU 30 repeatedly executes a routine illustrated in the flowchart of FIG. 10 every time a predetermined period of time passes.

First, in Step 1001, the support ECU 30 determines whether or not the collision avoidance support mode selection switch is positioned at the on position.

When determining "Yes" in Step 1001, the support ECU 30 proceeds to Step 1002, and the obstacle determination unit 34 determines whether or not there is an obstacle in front of the vehicle 10. Specially, the obstacle determination unit 34 determines whether or not a target positioned in front of the vehicle 10 is an obstacle using the first vehicle predicted track Vpo1.

When determining "Yes" in Step 1002, the support ECU 30 proceeds to Step 1003, and the collision determination unit 35 sets an alert flag to "1".

An initial value of the alert flag is "0".

When determining "No" in Step 1001 or 1002, the support ECU 30 proceeds to Step 1004, and the collision determination unit 35 sets the alert flag to "0".

When finishing the processing of Step 1003 or 1004, the support ECU 30 temporarily terminates the processing of this routine.

Figure 11:
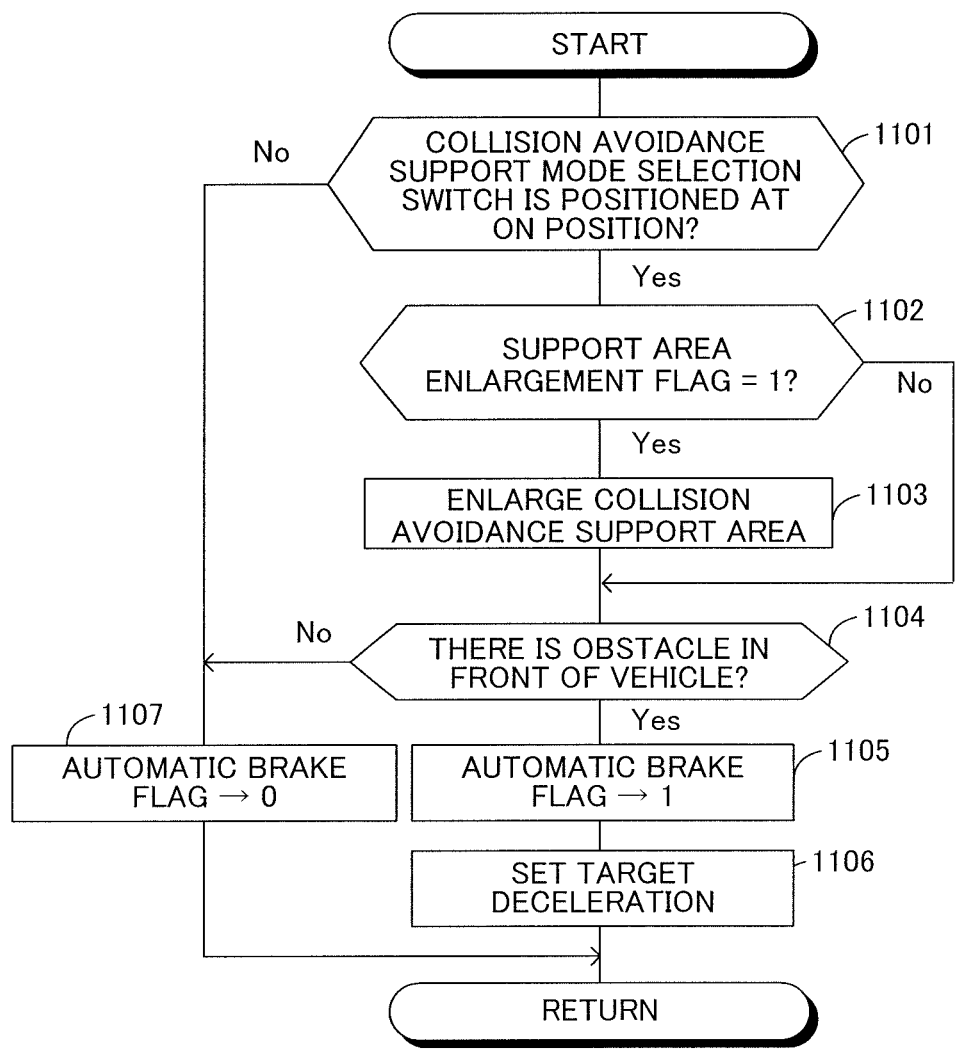
FIG. 11 is a flowchart for illustrating processing to be executed by the support ECU.

When the position of the ignition switch is switched from the off position to the on position, the support ECU 30 repeatedly executes a routine illustrated in the flowchart of FIG. 11 every time a predetermined period of time passes.

The processing of Step 1101 is the same as the processing of Step 1001.

When determining "Yes" in Step 1101, the support ECU 30 proceeds to Step 1002, and the obstacle determination unit 34 determines whether or not the support area enlargement flag is "1".

When determining "Yes" in Step 1102, the support ECU 30 proceeds to Step 1103, and the obstacle determination unit 34 enlarges the collision avoidance support area of when the automatic brake control is executed.

When finishing the processing of Step 1103, the support ECU 30 proceeds to Step 1104, and the obstacle determination unit 34 determines whether or not there is an obstacle in front of the vehicle 10. Specially, the obstacle determination unit 34 determines whether or not a target positioned in front of the vehicle 10 is an obstacle using the second vehicle predicted track Vpo2-l.

When determining "No" in Step 1102, the support ECU 30 proceeds to Step 1104, and the obstacle determination unit 34 determines whether or not there is an obstacle in front of the vehicle 10. Specially, the obstacle determination unit 34 determines whether or not a target positioned in front of the vehicle 10 is an obstacle using the second vehicle predicted track Vpo2-b.

When determining "Yes" in Step 1104, the support ECU 30 proceeds to Step 1105, and the collision determination unit 35 sets an automatic brake flag to "1". An initial value of the automatic brake flag is "0".

When finishing the processing of Step 1105, the support ECU 30 proceeds to Step 1106, and the target deceleration calculation unit 36 sets the target deceleration.

When determining "No" in Step 1101 or 1104, the support ECU 30 proceeds to Step 1107, and the collision determination unit 35 sets the automatic brake flag to "0".

When finishing the processing of Step 1106 or 1107, the support ECU 30 temporarily terminates the processing of this routine.

Figure 12:
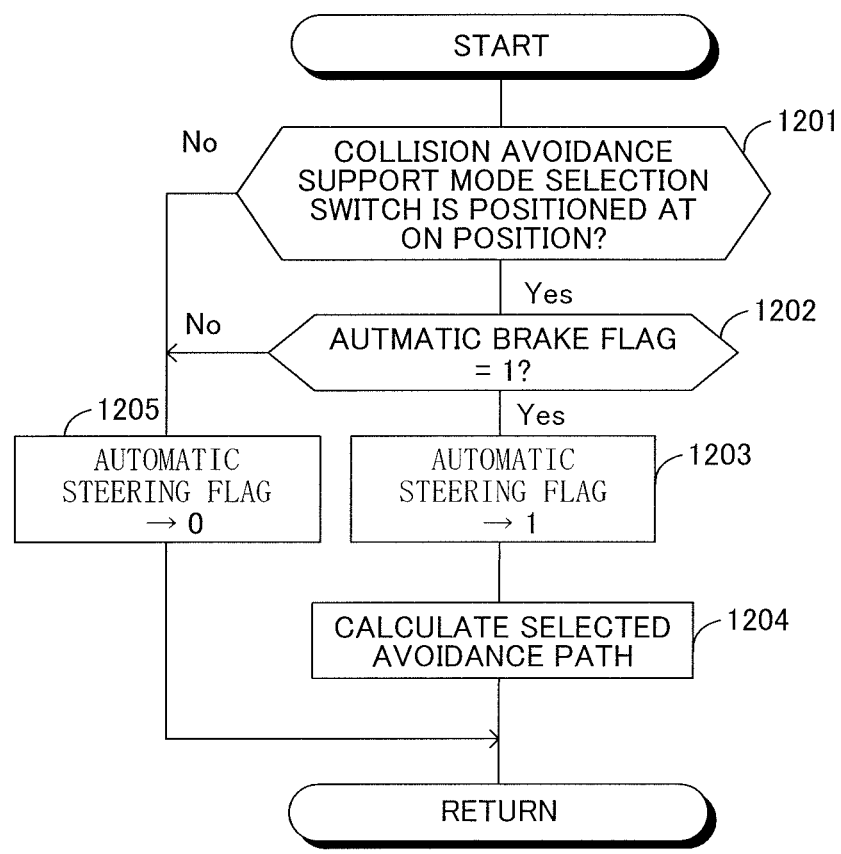
FIG. 12 is a flowchart for illustrating processing to be executed by the support ECU.

When the position of the ignition switch is switched from the off position to the on position, the support ECU 30 repeatedly executes a routine illustrated in the flowchart of FIG. 12 every time a predetermined period of time passes.

The processing of Step 1201 is the same as the processing of Step 1001.

When determining "Yes" in Step 1201, the support ECU 30 proceeds to Step 1202 to determine whether or not the automatic brake flag is "1".

When determining "Yes" in Step 1202, the support ECU 30 proceeds to Step 1203, and the collision determination unit 35 sets an automatic steering flag to "1" An initial value of the automatic steering flag is "0".

When finishing the processing of Step 1203, the support ECU 30 proceeds to Step 1204, and the avoidance target track calculation unit 37 calculates (identifies) the selected avoidance path.

When determining "No" in Step 1201 or 1202, the support ECU 30 proceeds to Step 1205, and the collision determination unit 35 sets the automatic steering flag to "0".

When finishing the processing of Step 1204 or 1205, the support ECU 30 temporarily terminates the processing of this routine.

Figure 13:
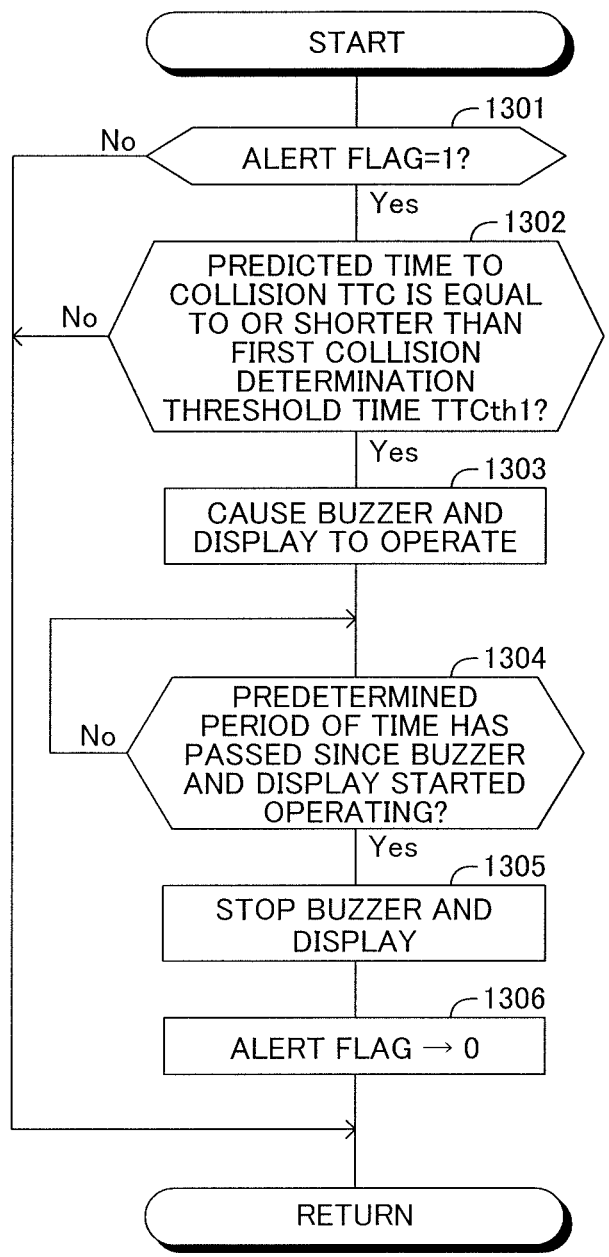
FIG. 13 is a flowchart for illustrating processing to be executed by the support ECU.

When the position of the ignition switch is switched from the off position to the on position, the support ECU 30 repeatedly executes a routine illustrated in the flowchart of FIG. 13 every time a predetermined period of time passes.

In Step 1301, the support ECU 30 determines whether or not the alert flag is "1".

When determining "Yes" in Step 1301, the support ECU 30 proceeds to Step 1302, and the collision determination unit 35 determines whether or not the predicted time to collision TTC is equal to or shorter than the first collision determination threshold time TTCth1.

When determining "Yes" in Step 1302, the support ECU 30 proceeds to Step 1303 to transmit the operation signal to the alert ECU 60. Then, the alert ECU 60 causes the buzzer 20 and the display 21 to operate.

When finishing the processing of Step 1303, the support ECU 30 proceeds to Step 1304 to determine whether or not a predetermined period of time has passed since the buzzer 20 and the display 21 started operating.

When determining "No" in Step 1304, the support ECU 30 repeats the processing of Step 1304.

Meanwhile, when determining "Yes" in Step 1304, the support ECU 30 proceeds to Step 1305 to transmit a stop signal to the alert ECU 60. Then, the alert ECU 60 stops the buzzer 20 and the display 21.

When finishing the processing of Step 1305, the support ECU 30 proceeds to Step 1306, and the collision determination unit 35 sets the alert flag to "0".

When the support ECU 30 determines "No" in Step 1301 or 1302, or finishes the processing of Step 1306, the support ECU 30 temporarily terminates the processing of this routine.

Figure 14:
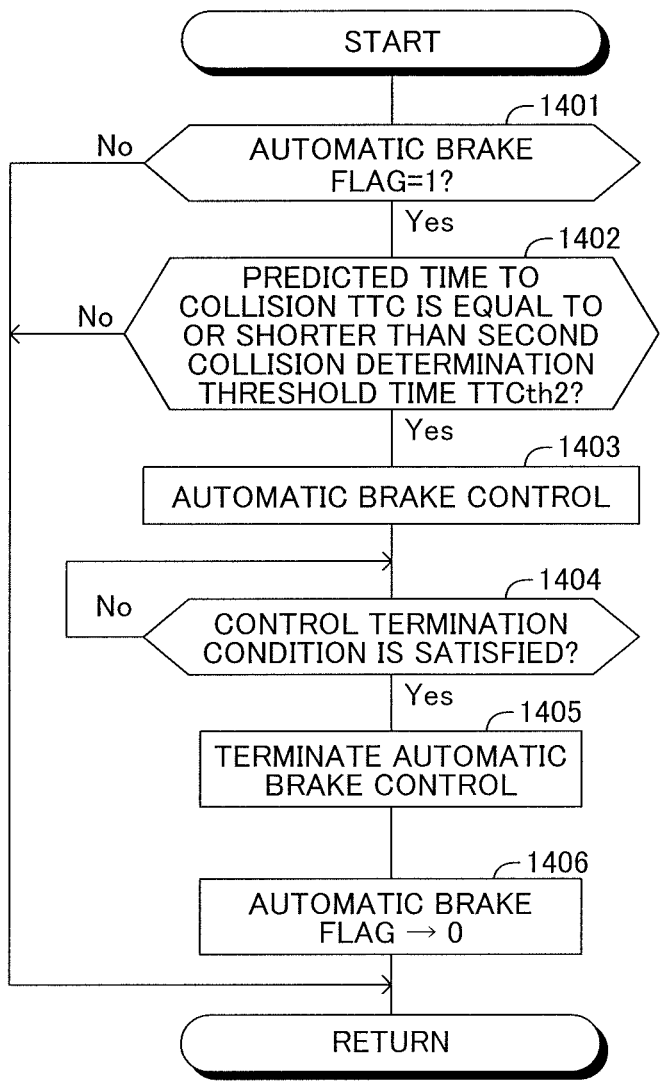
FIG. 14 is a flowchart for illustrating processing to be executed by the support ECU.

When the position of the ignition switch is switched from the off position to the on position, the support ECU 30 repeatedly executes a routine illustrated in the flowchart of FIG. 14 every time a predetermined period of time passes.

In Step 1401, the support ECU 30 determines whether or not the automatic brake flag is "1".

When determining "Yes" in Step 1401, the support ECU 30 proceeds to Step 1402, and the collision determination unit 35 determines whether or not the predicted time to collision TTC is equal to or shorter than the second collision determination threshold time TTCth2.

When determining "Yes" in Step 1402, the support ECU 30 proceeds to Step 1403 to transmit the operation signal to the brake ECU 40. Then, the brake ECU 40 starts the automatic brake control while using the target deceleration calculated in Step 1106.

When finishing the processing of Step 1403, the support ECU 30 proceeds to Step 1404, and the collision determination unit 35 determines whether or not the control termination condition is satisfied.

When determining "No" in Step 1404, the support ECU 30 repeats the processing of Step 1404.

Meanwhile, when determining "Yes" in Step 1404, the support ECU 30 proceeds to Step 1405, and the control unit 38 transmits a stop signal to the brake ECU 40.

When finishing the processing of Step 1405, the support ECU 30 proceeds to Step 1406, and the collision determination unit 35 sets the automatic brake flag to "0".

When the support ECU 30 determines "No" in Step 1401 or 1402, or finishes the processing of Step 1406, the support ECU 30 temporarily terminates the processing of this routine.

Figure 15:
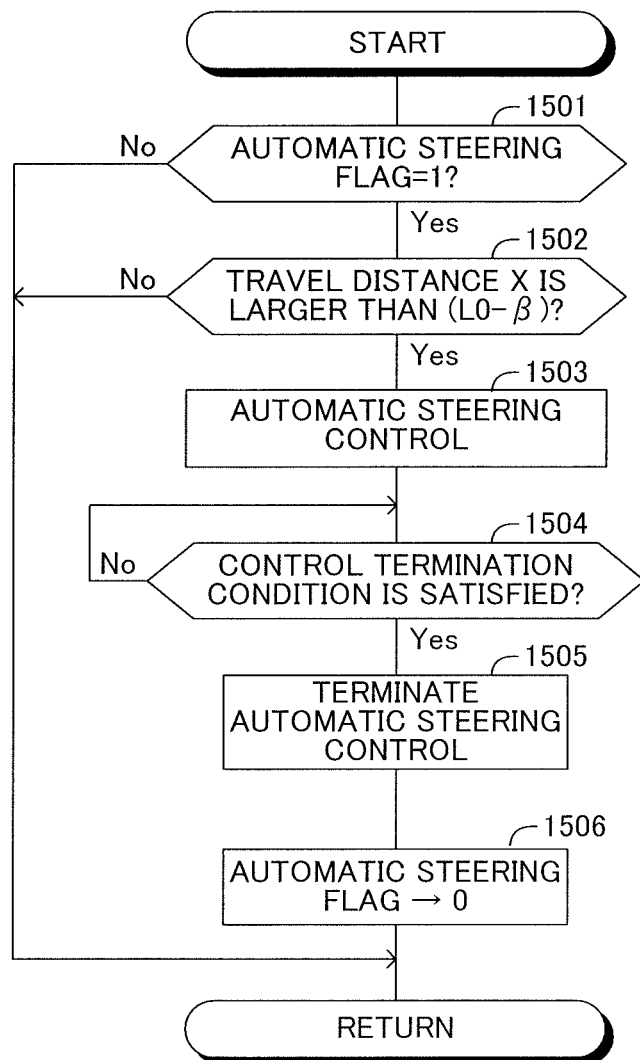
FIG. 15 is a flowchart for illustrating processing to be executed by the support ECU.

When the position of the ignition switch is switched from the off position to the on position, the support ECU 30 repeatedly executes a routine illustrated in the flowchart of FIG. 15 every time a predetermined period of time passes.

In Step 1501, the support ECU 30 determines whether or not the automatic steering flag is "1".

When determining "Yes" in Step 1501, the support ECU 30 proceeds to Step 1502 to determine whether or not the travel distance X is larger than the value (L0-β).

When determining "Yes" in Step 1502, the support ECU 30 proceeds to Step 1503 to transmit the operation signal to the steering ECU 50. Then, the steering ECU 50 causes the electric motor 18 to operate so that the vehicle 10 travels along the selected avoidance path calculated in Step 1204. In other words, the steering ECU 50 starts the automatic steering control.

Detail of control in Step 1504 is the same as that in Step 1404.

When determining "Yes" in Step 1504, the support ECU 30 proceeds to Step 1505, and the control unit 38 transmits a stop signal to the steering ECU 50.

When finishing the processing of Step 1505, the support ECU 30 proceeds to Step 1506, and the collision determination unit 35 sets the automatic steering flag to "0".

When the support ECU 30 determines "No" in Step 1501 or 1502, or finishes the processing of Step 1506, the support ECU 30 temporarily terminates the processing of this routine.

In the above, the collision avoidance support device according to this embodiment has been described, but the present invention is not limited to the above-mentioned embodiment, and various changes are possible within the range not departing from the object of the present invention.

For example, the brake ECU 40 may be configured to execute "left and right brake balance adjustment control" corresponding to the automatic steering control.

The "left and right brake balance adjustment control" is known control in which magnitudes of the braking forces applied from the friction brake mechanisms 22 to the left front and rear wheels 16FW and 16RW and magnitudes of the braking forces applied from the friction brake mechanisms 22 to the right front and rear wheels 16FW and 16RW are made different from each other, to thereby adjust the traveling direction of the vehicle 10.

The automatic steering control and the left and right brake balance adjustment control are both an example of traveling direction automatic control.

When the driver operates the steering wheel 15 for rotation under a state in which the traveling direction automatic control is being executed, the steering ECU 50 (or the brake ECU 40) may immediately terminate the traveling direction automatic control and execute steering control (or the left and right brake balance adjustment control) corresponding to the driver's steering operation.

The termination time of the automatic brake control and the termination time of the traveling direction automatic control may be made different from each other.

The surroundings sensor 28 does not need to include the radar sensor 29a and the camera 29b. For example, the radar sensor 29a and a monocular camera may be used to form the surroundings sensor 28.

Information of a navigation system may be used as information representing the shape of the road (travel lane) on which the vehicle 10 travels and the positional relationship between the road and the vehicle 10.

Alert means may include only one of the buzzer 20 and the display 21.

What is claimed is:

1. A device configured to:
   detect a target existing in front of a vehicle;
   determine whether a type of said target is pedestrian and said target is in a travel lane of a road in which said vehicle is traveling;
   calculate a target predicted track;
   calculate a vehicle predicted track which has a first width orthogonal in a plan view to a traveling direction of said vehicle, when it is determined that said type of said target is a pedestrian and said target is in said travel lane;
   calculate a vehicle predicted track which has a second width smaller than said first width, said second width being orthogonal in said plan view to said traveling direction of said vehicle, when it is determined that said object is an object other than an object whose type is a pedestrian and that is present in said travel lane;
   determine whether said target predicted track and said vehicle predicted track interferes; and
   execute, when it is determined that said target predicted track and said vehicle predicted track interferes, at least one of alert control to issue an alert and automatic brake control to activate a brake device of said vehicle.

2. The device of claim 1, wherein the target predicted track is a track said target is predicted to move on.

* * * * *